(12) United States Patent
Iwase et al.

(10) Patent No.: US 8,142,866 B2
(45) Date of Patent: Mar. 27, 2012

(54) DISPLAY PANEL, METHOD FOR PRODUCING THE SAME AND COMPOSITION OF INK USED BY THE METHOD FOR PRODUCING THE SAME

(75) Inventors: Teruhiko Iwase, Nagoya (JP); Takashi Aoki, Toyoake (JP); Osamu Ina, Anjo (JP); Yasuo Yoshihiro, Tokyo (JP); Yukitoshi Takahashi, Tokyo (JP); Shinichi Sato, Tokyo (JP)

(73) Assignees: Denso Corporation, Kariya (JP); Toyo Ink Mfg., Ltd., Tokyo (JP)

( * ) Notice: Subject to any disclaimer, the term of this patent is extended or adjusted under 35 U.S.C. 154(b) by 674 days.

(21) Appl. No.: 12/231,073

(22) Filed: Aug. 28, 2008

(65) Prior Publication Data

US 2009/0068418 A1    Mar. 12, 2009

(30) Foreign Application Priority Data

Aug. 29, 2007  (JP) ................................. 2007-222520
Oct. 16, 2007  (JP) ................................. 2007-268987

(51) Int. Cl.
*B41M 5/40* (2006.01)

(52) U.S. Cl. ............... 428/32.13; 428/32.23; 428/32.26; 428/195.1; 428/913.3

(58) Field of Classification Search ............... 428/32.13, 428/32.23, 32.26, 195.1, 913.3
See application file for complete search history.

(56) References Cited

U.S. PATENT DOCUMENTS

| | | | |
|---|---|---|---|
| 7,862,163 B2 | 1/2011 | Maeno et al. | |
| 2004/0024078 A1* | 2/2004 | Itoh et al. | ........................... 522/1 |
| 2005/0159501 A1* | 7/2005 | Kiefer-Liptak | .................. 522/71 |
| 2007/0020470 A1* | 1/2007 | Inakura et al. | ................. 428/483 |
| 2007/0071917 A1* | 3/2007 | Migitaka et al. | ........... 428/32.26 |

FOREIGN PATENT DOCUMENTS

| | | | |
|---|---|---|---|
| JP | 3031604 | | 9/1996 |
| JP | 2001-343260 | | 12/2001 |
| JP | 2003-261799 | | 9/2003 |
| JP | 2005-321343 | | 11/2005 |
| JP | 2005-327136 | | 11/2005 |
| JP | 2006-008998 | | 1/2006 |
| JP | 2006-214906 | | 8/2006 |
| JP | 2006-221044 A | * | 8/2006 |
| JP | 2007-093869 | | 4/2007 |
| JP | 2007-261203 | | 10/2007 |

OTHER PUBLICATIONS

Office action dated Oct. 11, 2011 in corresponding JP Application No. 2007-268987.

* cited by examiner

*Primary Examiner* — Betelhem Shewareged
(74) *Attorney, Agent, or Firm* — Harness, Dickey & Pierce, PLC

(57) ABSTRACT

A display panel has a resin substrate and a printed layer formed on at least a part of the resin substrate through inkjet printing. The printed layer is formed from cured products of UV-curable inks each containing UV-curable monomers which are polymerized and cured by UV irradiation, and the printed layer has at least two such cured products having different pencil hardness values.

27 Claims, 10 Drawing Sheets

DISPLAY PANEL, METHOD FOR PRODUCING THE SAME AND COMPOSITION OF INK USED BY THE METHOD FOR PRODUCING THE SAME

CROSS REFERENCES TO RELATED APPLICATION

The present application relates to and incorporates by reference Japanese Patent application No. 2007-222520 filed on Aug. 29, 2007 and Japanese Patent application No. 2007-268987 filed on Oct. 16, 2007.

BACKGROUND OF THE INVENTION

1. Field of the Invention

The present invention relates to a display panel used in, for example, the display devices for instrument gauges equipped in a vehicle or the like, and a method for producing the display panel.

2. Description of the Related Art

Conventionally, vehicles such as automobiles for example, are provided with an arrangement of display devices for instrument gauges in the dashboard facing the driver's seat. In general, as set forth in Japanese Patent Laid-open (unexamined) No. 2001-343260, a display device for vehicles (automotive instrument panel) includes a display panel having graphical design parts (printed layer) containing scales, characters and the like, and a light source disposed on the rear side of this display panel. In the display panel, the parts excluding the scales or characters of the graphical design parts are formed as opaque parts which do not allow light transmission, while the parts having scales or characters are formed as transmissive parts which allow light transmission. On the basis of such configuration, when the display panel is illuminated with the light source during night time, the transmissive parts such as the characters, scales and the like of the display panel can be brightly displayed. Furthermore, since the display panels used in the display devices for vehicles are demanded to have a high quality feel, visibility, texture and the like, the recent trend is directed to the use of display panels having three-dimensional shapes, produced by heat molding such as vacuum molding, air pressure molding or insert molding.

Such a display panel is usually produced by printing opaque parts (solid concealed image parts) on the surface of a transparent substrate made of a resin such as polycarbonate, using a screen printing method. After the printing process, the display panel may be subjected to cutting processing so as to make the external shape into a desired shape, or may be subjected to punching processing in order to form holes or the like on the display panel.

The screen printing method is a method of producing a screen (plate) on which a print image is drawn from the print data, and performing printing on a substrate through this screen using, for example, a solvent drying type ink, a thermocurable type ink or the like. This printing method is advantageous in that printing can be done at one time such that the print density of the opaque parts would be high. However, since the screen printing method is carried out by way of monochromatic printing, multilayer printing should be performed using inks of different colors in order to form graphical designs such as characters. Thus, there is a problem that the number of processing steps or the processing time may be increased. Furthermore, the screen printing method has a problem that there is limitation in the applicable designs, because accuracy of the printing position or resolution is generally low.

For the display panel for vehicles such as passenger cars, a display panel having a variety of graphical design parts formed in accordance with the vehicle model, engine displacement, vehicle grade and the like, is demanded. That is, the print contents to be formed on the display panel would vary with the type of the vehicle. Since it is required in the screen printing method to go through the procedure of replacing the plate and inks, setting the printing conditions and the like, whenever the type of the display panel is changed, there is a problem of an increase in the costs.

In addition, the screen printing method, which is a mass printing technique, is not suitable for manufacturing a small quantity of products such as trial products or supply products. In other words, there is a problem that processes such as plate making and lithographic plate making, which are incidental to the method, add to an increase in the costs.

On the other hand, in recent years, a remarkable progress has been achieved in the development of a printing method called on-demand printing, in which direct image drawing is possible, without the need to produce a plate from the print data. In particular, an inkjet method is a method of performing printing by spraying ink from electronically controlled printhead nozzles. Since this method requires a simple mechanism of apparatus and low initial costs, and exhibits high image resolution, the method is being rapidly adopted in the field of printers for office use and the like. Furthermore, long life type printers using solvent-based inks have also been developed for the use in signboards and the like.

However, employing the inkjet method in the formation of a printed layer of the display panel faced the following problems.

Specifically, because the above-described display panel used in vehicles and the like require optical transparency and heat resistance, a material such as polycarbonate or polyethylene terephthalate needs to be used as the base material of the display panel. However, when inkjet printing is performed on such material using an aqueous ink, ink droplets spatter on the surface, while in the case of a solvent-based ink, there is a risk that ink droplets aggregate before they dry, or the ink droplets dissolve the substrate, thus resulting in substrate deformation.

In recent years, as set forth in Japanese Patent Laid-open (unexamined) No. 2003-261,799 and No. 2006-8,998, inkjet printing methods using a UV-curable ink have been developed, and as set forth in Japanese Patent Laid-open (unexamined) No. 2006-214,906, a technology of producing display panels by forming a printed layer on a resin substrate using a UV-curable ink has been developed.

With regard to the inkjet printing method using UV-curable ink, it is required, in order to maintain the image quality above a certain level, that the UV-curable ink be cured within several seconds after the UV-curable ink jetted from nozzles of the printhead of an inkjet printing apparatus impacts on a substrate. Therefore, an inkjet printing apparatus employs a system in which a printhead and a UV irradiator are disposed side by side so that exposure can be carried out immediately after jetted ink impacts on a substrate. Meanwhile, the UV-curable ink is also required to have a tendency to be easily cured by UV irradiation and to be highly reactive.

The display panel used in the display devices for vehicles is often subjected to molding by means of a mold having a predetermined shape as described above, or subjected to punching processing, cutting processing or the like. For this reason, it has been desirable to use an ink having excellent stretchability and adhesiveness, as the UV-curable ink.

If a display panel is produced using an ink having insufficient stretchability and adhesiveness, there is a risk of cracks occurring in the printed layer at the time of subjecting the display panel to molding by means of a mold having a predetermined shape, or to punching processing, cutting processing or the like.

It has also been desirable to use an ink which would not cause tackiness at the surface of the printed layer even after the ink has been cured, in the display panel.

For that reason, it has been desirable for the UV-curable ink to have curability to a certain extent.

However, the UV-curable inks that are currently under development, are inks having excellent stretchability and adhesiveness but insufficient curability, or inks having excellent curability but insufficient stretchability and adhesiveness.

Since the combination of stretchability and adhesiveness, and curability are generally properties conflicting with each other, it has been very difficult to develop an ink having the properties of both sides to very high levels.

In particular, when the display panel is used in, for example, a display device for vehicles as described above, the display panel is disposed within a casing. For this purpose, inserting a part of the display panel into the casing has been tried so as to fix the display panel within the casing. In this case, the display panel is pressed at the fitting part of the casing and the display panel, and the pressed part may be subject to a stress as large as, for example, 1 MPa. Thus, in this case, it is desirable to use a UV-curable ink having particularly high curability, so that generation of cracks and the like can be avoided in the printed layer of the display panel. However, if an ink having curability so high to the extent of preventing cracks upon pressing is used, the stretchability and adhesiveness are impaired. Therefore, in this case, there is a problem that molding and processing of the display panel become difficult.

Accordingly, there has been a need to determine the design, in the case of producing a display panel through the technique of inkjet printing using a UV-curable ink, while taking into consideration the use of the display panel, the position of the pressed part, and the subsequent processes such as molding and processing. In other words, there has been a need to reduce the amount of molding or the amount of processing, or to design the display panel not to have a printed layer provided at the pressed part, thereby limitation being imposed on the design of display panels.

On the other hand, the UV-curable inks that are currently under development have excellent stretchability and adhesiveness, but on the other hand, have a problem of insufficient curability. For that reason, with regard to the display panel produced using such a UV-curable ink, there is a risk that tackiness may still remain at the surface of the printed layer even after the ink has been cured, and have deteriorated durability of the printed layer. Specifically, there is a risk that, for example, the ink may leave marks when there occurs a contact with the printed layer after curing, or that if a display panel having the printed layer formed therein is stored in piles, the display panels may adhere to each other through the printed layer, or the printed layer may be transferred to the display panel.

Meanwhile, UV-curable inks having excellent curability are also under development. However, the inks having excellent curability have insufficient stretchability and adhesiveness. For that reason, in the display panels produced using such UV-curable inks, there is a risk that cracks may be generated in the printed layer when the display panel is subjected to molding by means of a mold having a predetermined shape, or subjected to punching processing, cutting processing or the like. Also, at the time of applying a casing, there is a risk that cracks may be generated in the printed layer because of the stress exerted on the fitting part of the display panel and the casing of the display device or the like.

SUMMARY OF THE INVENTION

The present invention has been made in view of such conventional problems, and thus, it is an object of the present invention to provide a display panel capable of coping with various designs and molding processing, and a method for producing the display panel.

According to a first aspect of the present invention, there is provided a display panel comprising a resin substrate and a printed layer formed on at least a part of the resin substrate by inkjet printing, wherein the printed layer comprises cured products of UV-curable inks each containing a UV-curable monomer which is polymerized and cured upon UV irradiation, and the printed layer has at least two such cured products having different pencil hardness values.

With regard to the display panel according to the first aspect of the invention, particular attention should be paid to the fact that a printed layer having at least two cured products having different pencil hardness values, is formed on the resin substrate.

That is, in the display panel of the invention, the printed layer has at least a cured product having higher pencil hardness and a cured product having lower pencil hardness. Furthermore, the positions at which the cured products having different pencil hardness values are formed, can be appropriately determined at the time of producing the display panel.

For that reason, the display panel can have, for example, the cured product having higher pencil hardness formed at the pressed part which is brought to contact with other members and is under a pressing force, or can have, for example, the cured product having lower pencil hardness formed at a molded part and/or a processed part, which will be subjected to molding and/or processing, or the like.

Therefore, it is now possible for the display panel of the invention to be molded by means of a mold having a predetermined shape, or to be subjected to punching processing, cutting processing or the like, with hardly any cracks being generated in the printed layer. Furthermore, or example, even in the case where the display panel is put into use while being pressed by another member, generation of cracks or the like in the printed layer due to the stress exerted on the pressed part of the display panel, can be prevented.

The pencil hardness of the cured product of a UV-curable ink can be altered, for example, by adjusting the composition of the UV-curable monomer contained in the UV-curable ink, or the like. Thus, the pencil hardness can be altered without changing the color of the UV-curable ink, regardless of whether the UV-curable ink maintains the same color or obtains a different color. Accordingly, in the display panel of the invention, the cured products having different pencil hardness values can be formed to have the same color or different colors, and thus the printed layer can be formed in various designs.

Therefore, with regard to the display panel of the invention, it is almost unnecessary to reduce the amount of molding and/or the amount of processing during molding and/or processing, or to modify the design of the graphical designs to be formed by printing, on the contrary to the conventional practices.

Therefore, according to the first aspect of the present invention, a display panel capable of coping with various designs and molding processing can be provided.

According to a second aspect of the present invention, there is provided a method for producing a display panel having a resin substrate and a printed layer formed on at least a part of the resin substrate, the printed layer being formed from cured products of UV-curable inks each containing a UV-curable monomer which is polymerized and cured by UV irradiation, and the printed layer having at least two cured products having different pencil hardness values, the method comprising jetting, by means of inkjet printing, at least two UV-curable inks which obtain different pencil hardness values after being cured, on at least a tart of the resin substrate, and irradiating the UV-curable inks with UV to cure the UV-curable inks, and to thereby form the cured products.

According to the second aspect of the invention, the cured products are formed through inkjet printing, by jetting the at least two or more UV-curable inks which obtain different-pencil hardness values after being cured, on at least a part of the resin substrate, and irradiating the resin substrate with UV to cure the UV-curable inks, and to form the cured products.

For that reason, a printed layer having at least a cured product having higher pencil hardness and a cured product having lower pencil hardness, can be formed on the resin substrate. The respective positions at which the cured products having different pencil hardness values will be formed, can be appropriately determined at the time of performing inkjet printing.

Thus, for example, the display panel can have, for example, the cured product with higher pencil hardness formed at the pressed part which will be brought to contact with other members and put under a pressing force, or can have, for example, the cured product with lower pencil hardness formed at a molded part and/or a processed part, which will be subjected to molding and/or processing, or the like.

Therefore, it is now possible for the display panel of the invention to be molded by means of a mold having a predetermined shape, or to be subjected to punching processing, cutting processing or the like, with hardly any cracks being generated in the printed layer. Furthermore, for example, even in the case where the display panel is put into use while being pressed by another member, there can be produced a display panel in which generation of cracks or the like in the printed layer due to the stress exerted on the pressed part of the display panel, can be prevented.

The pencil hardness of the cured product of the UV-curable ink can be altered, for example, by adjusting the composition of the UV-curable monomer contained in the UV-curable ink, or the like. For that reason, the pencil hardness can be altered without changing the color of the UV-curable ink, regardless of whether the UV-curable ink maintains the same color or obtains a different color. Accordingly, in the display panel of the invention, the cured products having different pencil-hardness values can be formed to have the same color or different colors, and thus the printed layer can be formed in various designs.

Thus, for the display panel of the invention, it is hardly necessary to reduce the amount of molding and/or the amount of processing during molding and/or processing, or to modify the design of the graphical design formed by printing, on the contrary to the conventional practices.

Therefore, according to the second aspect of the invention, a method for producing a display panel capable of coping with various designs and molding processing, can be provided.

According to the present invention, the display panel has a resin substrate, and a printed layer formed on at least a part of the resin substrate by inkjet printing. The printed layer is formed from cured products of UV-curable inks each containing a UV-curable monomer which is Polymerized and cured by UV irradiation.

It is preferable that the resin substrate is light transmissive, while the printed layer has transmissive parts which transmit visible light and opaque parts which do not transmit visible light. It is also preferable that the display panel of the invention is used as a backlight type display panel in which the transmissive parts in the printed layer are brightly displayed, by illuminating light onto the display panel from the rear surface on the opposite side of the surface viewed by users (graphical design surface).

In this case, the printed layer in the display panel can exhibit excellent graphical design properties to the maximum. Furthermore, in this case, the display panel can be suitably used as a display panel for automotive instrument panel in the dashboard facing the driver's seat in the interior of an automobile, or as a display panel for air-conditioners or the like.

A display panel for automotive instrument panel is shown in FIG. 1 as an example of applying the display panel as a backlight type display panel. In this display panel (display panel for automotive instrument panel), a printed layer having scales or characters (cured product of a UV-curable ink) or a non-printed layer formed on a resin substrate form transmissive parts, and the graphical design of the transmissive parts can be brightly displayed by the light from the light source disposed on the rear surface side of the resin substrate. In the parts other than the transmissive parts on the resin substrate, a printed layer formed from a black UV-curable ink (cured product of a UV-curable ink) is formed, and this black printed layer forms opaque parts.

The transmissive parts and the opaque parts can be formed by adjusting the color, thickness and print density of the printed layers. The transmissive parts can be formed, for example, by making the thickness of the printed layer smaller, making the print density smaller, making the color density smaller, or the like. On the other hand, the opaque parts can be formed, for example, by making the thickness of the printed layer larger, laminating a printed layer formed form a black UV-curable ink, or the like.

According to the present invention, the printed layer has at least two cured products having different pencil hardness values.

The pencil hardness of the cured products can be measured by the method prescribed in JIS K5400 (version of year 2004).

Preferably, the printed layer may have a cured product as described above, having a pencil hardness value of 2H or higher, and having a cured product as described above, having a pencil hardness of HB or lower.

In this case, the display panel exhibits excellent hardness in the site where the cured product having a high pencil hardness of 2H or higher is formed, and thus can exhibit more excellent durability against pressing from the outside. On the other hand, the display panel can exhibit excellent stretchability at the site where the cured product having a low pencil hardness of HB or lower is formed, and thus can exhibit more excellent processability and moldability.

More preferably, the printed layer may have a cured product having a pencil hardness of 2H or higher and a cured product having a pencil hardness of 2B or lower.

As for the resin substrate, a substrate formed from polycarbonate, polyethylene terephthalate or the like can be used.

In this case, since transmissibility can be imparted to the resin substrate, the display panel of the invention can be suitably used as the backlight type display panel.

According to the first aspect of the present invention, the printed layer preferably has at least two cured products having different pencil hardness values and having the same color.

Furthermore, according to the second aspect of the present invention, for the inkjet printing, it is preferable to use inks of the same color as the at least two UV-curable inks which obtain different pencil hardness values after curing.

In this case, a printed layer in which the boundaries between the two or more cured products having different pencil hardness values are hardly distinguishable from the external appearance, can be formed. For that reason, the graphical design properties of the display panel can be further enhanced.

According to the first aspect of the present invention, it is preferable that the UV-curable inks each contain a monofunctional monomer and a polyfunctional monomer as the UV-curable monomers, and the at least two cured products having different pencil hardness values are formed from at least two UV-curable inks having different contents of the polyfunctional monomer.

According to the second aspect of the present invention, it is preferable that the UV-curable inks each contain a monofunctional monomer and a polyfunctional monomer, and as the at least two UV-curable inks which obtain different pencil hardness values after curing, at least two inks having different contents of the polyfunctional monomer are used.

In this case, the cured products having different pencil hardness values can be formed conveniently.

According to the first aspect and the second aspect of the present invention, it is preferable that the UV-curable inks contain at least phenoxyethyl acrylate as the monofunctional monomer, and contain the phenoxyethyl acrylate as the main component.

In this case, cured products having excellent stretchability and adhesiveness, and also having the tackiness after curing prevented, can be formed.

The UV-curable inks may also contain other monofunctional monomers in addition to phenoxyethyl acrylate (PEA).

As the monofunctional monomer, for example, a monomer having a cyclic structure can be used. Specifically, for example, there may be mentioned cyclohexyl acrylate, tetrahydrofurfuryl acrylate, benzyl acrylate, methylphenoxyethyl acrylate, 4-t-butylcyclohexyl acrylate, caprolactone-modified tetrahydrofurfuryl acrylate, tribromophenyl acrylate, ethoxidized tribromophenyl acrylate, 2-phenoxyethyl acrylate (or its ethylene oxide and/or propylene oxide addition monomer), acryloylmorpholine, isobornyl acrylate, phenoxydiethylene glycol acrylate, vinylcaprolactam, vinylpyrrolidone, 2-hydroxy-3-phenoxypropyl acrylate, 1,4-cyclohexanedimethanol monoacrylate, N-acryloyloxyethyl hexahydrophthalimide and the like. As the monofunctional monomer, one or two or more monomers selected from these can be used.

Furthermore, among these, as a monomer having high inkjet suitability, cyclohexyl acrylate, methylphenoxyethyl acrylate, 2-phenoxyethyl acrylate (or its ethylene oxide and/or propylene oxide addition monomer), isobornyl acrylate, vinylcaprolactam, vinylpyrrolidone, 2-hydroxy-3-phenoxypropyl acrylate, 1,4-cyclohexanedimethanol monoacrylate or N-acryloyloxyethyl hexahydrophthalimide can be more suitably used.

Moreover, from the viewpoint of safety or coating performance, methylphenoxyethyl acrylate, 2-phenoxyethyl acrylate (or its ethylene oxide and/or propylene oxide addition monomer), isobornyl acrylate, vinylcaprolactam, 2-hydroxy-3-phenoxypropyl acrylate or 1,4-cyclohexanedimethanol monoacrylate can be more suitably used.

Also, from the viewpoint of stability, 2-phenoxyethyl acrylate or N-acryloyloxyethyl hexahydrophthalimide can be even more suitably used.

As the polyfunctional monomer, as will be shown below, a monomer having a cyclic structure can be used.

Specific examples include bisphenol A diacrylate, dimethylol-tricyclodecane diacrylate, propoxidized bisphenol A di(meth)acrylate, ethoxidized bisphenol A di(meth)acrylate, bisphenol F diacrylate, nitroxidized bisphenol F diacrylate, propoxidized bisphenol F diacrylate, cyclohexanedimethanol di(meth)acrylate, dimethyloldicyclopentane diacrylate, ethoxidized isocyanuric acid triacrylate, tri(2-hydroxyethyl isocyanurate) triacrylate, tri(meth)allyl isocyanurate, isocyanuric acid diacrylate, propoxidized isocyanuric acid diacrylate, caprolactone-modified dipentaerythritol hexaacrylate and the like. As the polyfunctional monomer, one or two or more monomers selected from these can be used.

Furthermore, among these, as a monomer having high inkjet suitability, bisphenol A diacrylate, propoxidized bisphenol A di(meth)acrylate, ethoxidizied bisphenol A di(meth)acrylate, bisphenol F diacrylate, ethoxidized bisphenol F diacrylate, propoxidized bisphenol F diacrylate, isocyanuric acid diacrylate, ethoxidized isocyanuric acid diacrylate, propoxidized isocyanuric acid diacrylate, ethoxidized isocyanuric acid triacrylate, or caprolactone-modified dipentaerythritol hexaacrylate can be more suitably used.

As the monofunctional monomer and the polyfunctional monomer, if the monomers having a cyclic structure as described above are mixed, adhesiveness of the printed layer (the above-described cured product) to the resin substrate can be enhanced. The principle is not known exactly, but it is believed that the cyclic structure part adheres to the resin substrate on the surface, and the adhesiveness is enhanced by an increase in the Van der Waals force.

As the monofunctional monomer and the polyfunctional monomer, monomers which do not have a cyclic structure can also be used, if necessary.

As the monofunctional monomer which does not have a cyclic structure, for example, 2-hydroxyethyl acrylate, 2-hydroxypropyl acrylate, 4-hydroxybutyl acrylate, isobutyl acrylate, t-butyl acrylate, isooctyl acrylate, 2-methoxyethyl acrylate, methoxytriethylene glycol acrylate, 2-ethoxyethyl acrylate, 3-methoxybutyl acrylate, ethoxyethoxyethyl acrylate, butoxyethyl acrylate, ethoxydiethylene glycol acrylate, methoxydipropylene glycol acrylate, dipropylene glycol acrylate, β-carboxylethyl acrylate, ethyl diglycol acrylate, trimethylolpropaneformal monoacrylate, imide acrylate, isoamyl acrylate, ethoxidized succinic acid acrylate, trifluoroethyl acrylate, ω-carboxypolycaprolactone monoacrylate, N-vinyl formamide and the like can be used. As the monofunctional monomer, one or two or more monomers selected from these can be used.

As the polyfunctional monomer which does not have a cyclic structure, for example, ethylene glycol di(meth)acrylate, diethylene glycol di(meth)acrylate, polyethylene glycol di(meth)acrylate, 1,6-hexanediol di(meth)acrylate, ethoxidized 1,6-hexanediol diacrylate, neopentyl glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, hydroxypivalic acid neopentyl glycol diacrylate, 1,3-butylene glycol di(meth)acrylate, trimethylolpropane triacrylate, hydroxypivalic acid trimethylolpropane triacrylate, ethoxidized phosphoric acid triacrylate, ethoxidized tripropylene glycol diacrylate, neopentyl glycol-modified trimethylolpropane diacrylate, stearic acid-modified pentaerythritol diacrylate, pentaerythritol triacrylate, tetramethylolpropane triacrylate, tetramethylolmethane triacrylate, pentaerythritol tetraacrylate, caprolactone-modified trimethylolpropane triacrylate, propoxylate gliceriltriacrylate, tetramethylolmethane triacrylate, pentaerythritol tetraacrylate, ditrimethylolpropane tetraacrylate, ethoxidized pentaerythritol tetraacrylate, dipentaerythritol hexaacrylate, caprolactone-modified dipentaerythritol hexaacrylate, dipentaerythritol hydroxypentaacrylate, neopentyl glycol oligoacrylate, 1,4-butanediol oligoacrylate, 1,6-hexanediol oligoacrylate, trimethylolpropane oligoacrylate, pentaerythritol oligoacrylate, ethoxidized neopentyl glycol di(meth)acrylate, propoxidized neopentyl glycol di(meth)acrylate, tripropylene glycol di(meth)acrylate, ethoxidized trimethylolpropne triacrylate, propoxidized trimethylolpropane triacrylate or the like can be used. As the polyfunctional monomer, one or two or more monomers selected from these can be used.

Furthermore, in the case where higher stretchability is required, irrespective of the presence or absence of cyclic structure, it is preferable to use a bifunctional monomer as the polyfunctional monomer.

Among these, the UV-curable monomer preferably has a molecular weight of less than 2000 in order to secure long-term print image stability and to be finished as a low-viscosity ink, and more preferably does not contain a monomer having a molecular weight of 2000 or higher, as the UV-curable monomer.

The UV-curable inks can contain, in addition to the UV-curable monomers, pigments of respective colors, polymerization initiators, dispersants and the like.

According to the first aspect of the present invention, it is preferable that the at least two cured products having different pencil hardness values are formed from a low concentration polyfunctional monomer ink containing 5 parts by weight or less of the polyfunctional monomer in 100 Tarts by weight of the UV-curable monomer, and a high concentration polyfunctional monomer ink containing 10 parts by weight or more of the polyfunctional monomer in 100 parts by weight of the UV-curable monomer.

According to the second aspect of the present invention, it is preferable that as the at least two UV-curable inks which obtain different pencil hardness values after curing, a low concentration polyfunctional monomer ink containing 5 parts by weight or less of the polyfunctional monomer in 100 parts by weight of the UV-curable monomer, and a high concentration polyfunctional monomer ink containing 10 parts by weight of the polyfunctional monomer in 100 parts by weight of the UV-curable monomer are used.

In these cases, cured products having sufficiently different pencil hardness values can be conveniently formed.

Furthermore, the cured product formed from the low concentration polyfunctional monomer ink can exhibit excellent stretchability and/or adhesiveness, and at the site where such cured product is formed, molding and processing of the display panel can be performed, with hardly any cracks or the like being generated in the printed layer.

The cured product formed from the high concentration polyfunctional monomer ink can exhibit high hardness, and at the site where such cured product is formed, the display panel can be pressed by another member, with hardly any cracks or the like being generated in the printed layer.

If the content of the polyfunctional monomer in the low concentration polyfunctional monomer ink exceeds 5 parts by weight, there is a risk that a cured product capable of showing excellent stretchability and/or adhesiveness cannot be formed. For that reason, there is a risk that cracks, peeling and the like may be generated in the printed layer during molding and/or processing. More preferably, the content of the polyfunctional monomer in the low concentration polyfunctional monomer ink is 3 parts by weight or less.

On the other hand, if the content of the polyfunctional monomer in the high concentration polyfunctional monomer ink is less than 10 parts by weight, there is a risk that a cured product having a sufficiently excellent curability cannot be formed. For that reason, there is a risk that cracks and the like may be generated in the printed layer while making the printed layer of the display panel to press another member.

According to the first aspect of the present invention, it is preferable that the display panel has a pressed part where another member is pressed over at least a part of the display panel, and the printed layer has the cured product formed from the high concentration polyfunctional monomer ink at least at the pressing part.

According to the second aspect of the present invention, it is preferable that the display panel has a pressing part where another member is pressed over at least a part of the display panel, and during the process of inkjet printing, the cured product formed from the high concentration polyfunctional monomer ink is formed at least at the pressing part on the resin substrate.

In this case, the cured product formed from the high concentration polyfunctional monomer ink can fully take advantage of the excellent hardness. That is, in this case, even if the display panel is put into use while making the display panel to press another member at the pressing part, generation of cracks or the like in the printed layer can be prevented.

According to the first aspect of the present invention, it is preferable that the display panel has a molding part and/or processing part where at least a part of the display panel is subjected to molding and/or processing, and the printed layer has the cured product formed from the low concentration polyfunctional monomer ink at least at the molding part and/or the processing part.

According to the second aspect of the present invention, it is preferable that the display panel has a molding part and/or processing part where at least a part of the display panel is subjected to molding and/or processing, and during the process of inkjet printing, the cured product formed from the low concentration polyfunctional monomer ink is formed at least at the molding part and/or the processing part on the resin substrate.

In these cases, the cured product formed from the low concentration polyfunctional monomer ink can fully take advantage of the excellent stretchability and adhesiveness. That is, even if the display panel is molded and/or processed at the molding part and/or the processing part, generation of cracks, peeling or the like in the printed layer can be prevented.

According to the first aspect of the present invention, the at least two cured products having different pencil hardness values can be formed on the resin substrate in a laminated state or in parallel on approximately the same plane.

According to the second aspect of the present invention, during the process of inkjet printing, the at least two cured products having different pencil hardness values can be formed on the resin substrate in a laminated state or in parallel in approximately the same plane.

That is, as shown in FIG. 6 and FIG. 7, at least two cured products 21 and 25 having different pencil hardness values can be formed on the resin substrate 15 in parallel in approximately the same plane to provide a printed layer 2.

FIG. 6 shows a configuration in which dots that are printed by inkjet printing are superimposed on a plane and printed, and thereby the cured product 21 and the cured product 25 formed over a relatively wide range are formed in parallel in approximately the same plane.

On the other hand, FIG. 7 shows a configuration in which printing is performed partially and alternately in every other pitch by inkjet printing, using at least two UV-curable inks which obtain different pencil hardness values after curing, and the cured product 21 and the cured product 25 which have different pencil hardness values are formed in an alternating fashion.

Furthermore, as shown in FIG. 8 and FIG. 9, at least two cured products 21 and 25 having different pencil hardness values can be formed on the resin substrate 15 in an at least partially laminated state, to provide a printed layer 2.

FIG. 8 shows a configuration in which a cured product having higher pencil hardness 25 is partially laminated on a cured product having lower pencil hardness 21.

On the other hand, FIG. 9 shows a configuration in which a cured product having lower pencil hardness 21 is partially laminated on a cured product having higher pencil hardness 25.

According to the first aspect and the second aspect of the present invention, the display panel is preferably used in an automotive instrument panel.

In this case, the feature of the display panel of being capable of coping with various designs and/or molding processing can be advantageously used, and the display panel can be correspondingly applied to automotive instrument panels where various graphical design parts have been formed in accordance with the vehicle model, engine displacement, vehicle grade and the like.

According to the second aspect of the present invention, it is preferable that the inkjet printing is performed using an inkjet printing apparatus equipped with at least two ink tanks respectively containing the at least two UV-curable inks which obtain different pencil hardness values after curing.

In this case, the printed layer having the at least two cured products which obtain different pencil hardness values after curing, can be conveniently formed by inkjet printing.

Specifically, as shown in FIG. 5, an inkjet printing apparatus 7 can be equipped with at least two ink tanks 71 and 72, each containing a UV-curable ink of each color such as, for example, cyan, magenta, yellow or black, with the UV-curable ink of each color containing the UV-curable inks which obtain different pencil hardness values after curing (see FIG. 5).

In this case, the inkjet printing apparatus 1 can jet out UV-curable inks of respective colors 200 and 250, which obtain different pencil hardness values, on the resin substrate 15 from the printhead nozzles for each color in the respective ink tanks 71 and 72. For that reason, the printed layer 2 having a desired design can be formed by controlling the jetting of each of the UV-curable inks 200 and 250 from the ink tanks 71 and 72 to perform printing, and at the same time, the cured products having different pencil hardness values and different colors can be conveniently formed.

Furthermore, according to the first aspect and the second aspect of the present invention, in the display panel, a transparent overcoat layer for delustering the surface can be formed on the outermost layer of the surface on the side viewed by users (graphical design surface), and this overcoat layer can be formed by inkjet printing, screen printing, or the like.

And the present invention has been made in view of such conventional problems, and thus, it is also an object of the present invention to provide a display panel having excellent moldability and processability, as well as having a printed layer having excellent curability, adhesiveness and durability, and a method for producing the display panel.

According to a third aspect of the present invention, there is a method for producing a display panel having a resin substrate and a printed layer formed on at least a part of the resin substrate, the method comprising jetting, by means of inkjet printing, a UV-curable ink containing UV-curable monomers which are polymerized and cured by UV irradiation, on at least a part of the resin substrate, and irradiating the resin substrate with UV to cure the UV-curable ink, and to thereby form a printed layer, wherein the UV-curable ink contains a monofunctional monomer and a polyfunctional monomer as the UV-curable monomers, and the UV-curable ink contains at least vinylcaprolactam and N-acryloyloxyethylhexahydrophthalimide as the monofunctional monomers.

With regard to the third aspect of the invention described above, particular attention should be paid to the fact that a display panel is produced by inkjet printing, using a specific UV-curable ink.

That is, a UV-curable ink containing at least vinylcaprolactam and N-acryloyloxyethylhexahydrophthalimide as the monofunctional monomers among the UV-curable monomers which are polymerized and cured by UV irradiation, is used.

For that reason, when curing occurs as crosslinking proceeds between UV-curable monomers upon UV irradiation, the curing rate can be enhanced by a synergistic effect between vinylcaprolactan and N-acryloyloxyethylhexahydrophthalimide. As a result, an appropriate number of crosslinking points are formed. Thereby, the printed layer obtains excellent curability and adhesiveness, as well as high levels of stretchability and hardness.

Therefore, it is now possible for the display panel of the invention to be molded by means of a mold having a predetermined shape, or to be subjected to punching processing, cutting processing or the like, with hardly any cracks being generated in the printed layer. Furthermore, the printed layer will not suffer from tackiness or the like, but can exhibit excellent durability.

As described above, according to the third aspect of the present invention, there can be provided a method for producing a display panel having excellent moldability and processability, as well as having a printed layer having excellent curability, adhesiveness and durability.

According to a fourth aspect of the present invention, a display panel produced by the production method according to the first aspect of the invention is provided.

The display panel according to the fourth aspect of the invention is a display panel produced by the production method according to the first aspect of the invention. Therefore, the display panel has excellent moldability and processability, and also has a printed layer having excellent curability, adhesiveness and durability, as described above.

According to the present invention, a display panel is produced by jetting, by means of inkjet printing, the UV-curable ink on at least a part of the resin substrate, irradiating UV to cure the UV-curable ink, and thereby forming a printed layer.

As the UV-curable ink, an ink containing a monofunctional monomer and a polyfunctional monomer as UV-curable monomers, is used.

Preferably, the UV-curable ink may contain, as the UV-curable monomers, 3.0 to 18.0 parts by weight of the polyfunctional monomer relative to 100 parts by weight of the monofunctional monomer.

If the content of the polyfunctional monomer exceeds 18.0 parts by weight, there is a risk that the printed layer may become excessively hard, and the stretchability or adhesiveness of the printed layer may be insufficient. On the other hand, if the content of the polyfunctional monomer is less than 3.0% by weight, there is a risk that the hardness of the printed layer may become insufficient, and durability of the printed layer may be decreased. More preferably, the content of the polyfunctional monomer may be 3.0 parts by weight to 11.0 parts by weight, relative to 100 parts by weight of the monofunctional monomer.

The UV-curable ink contains, as the monofunctional monomer, at least vinylcaprolactam and N-acryloyloxyethyl hexahydrophthalimide.

Preferably, the UV-curable ink contains the vinylcaprolactam and the N-acryloyloxyethyl hexahydrophthalimide at a weight ratio of vinylcaprolactam:N-acryloyloxyethyl hexahydrophthalimide=1:0.2 to 2.

With regard to the weight ratio of vinylcaprolactam and N-acryloyloxyethyl hexahydrophthalimide, if the ratio of N-acryloyloxyethyl hexahydrophthalimide is less than 0.2, there is a risk that the UV-curability of the UV-curable ink is decreased, and tack (tackiness) may occur in the printed layer. On the other hand, if the ratio exceeds 2, there is a risk that the viscosity of the UV-curable ink may be increased, and thus jetting cannot be well achieved during the inkjet printing process.

Furthermore, the UV-curable ink preferably contains, as the monofunctional monomer, phenoxyethyl acrylate (hereinafter, appropriately abbreviated to "PFA").

In this case, for example, the adhesiveness to the resin substrate which is formed from polycarbonate or the like, can be further enhanced.

The UV-curable ink can further contain another monofunctional monomer, in addition to the vinylcaprolactam, N-acryloyloxyethyl hexahydrophthalimide and PEA. Specifically, for example, a monofunctional monomer having a cyclic structure can be used.

Examples of the monofunctional monomer having a cyclic structure are previously described.

Furthermore, examples of a monomer having high inkjet suitability among these are also previously described.

Moreover, from the viewpoint of safety and coating performance, isobornyl acrylate, 2-hydroxy-3-phenoxypropyl acrylate, 1,4-cyclohexanedimethanol monoacrylate and the like can be more suitably used.

The UV-curable ink preferably contains, as the monofunctional monomer, 55 to 93% by weight of phenoxyethyl acrylate, 5 to 30% by weight of vinylcaprolactam, and 2 to 15% by weight of N-acryloyloxyethyl hexahydrophthalimide.

If the content of vinylcaprolactam is less than 5% by weight, there is a risk that the UV-curability of the UV-curable ink may be deteriorated, and tack (tackiness) may occur in the printed layer. On the other hand, if the content of vinylcaprolactam is greater than 30% by weight, there is a risk that the storage stability of the UV-curable ink is deteriorated, and for example, when stored at normal temperature, the viscosity of the UV-curable ink increases, thus making the handling of the ink difficult.

If the content of N-acryloyloxyethyl hexahydrophthalimide is less than 2% by weight, there is a risk that the UV-curability of the UV-curable ink may be deteriorated, and tack (tackiness) may occur in the printed layer. On the other hand, if the content is greater than 15% by weight, there is a risk that the viscosity may increase, making the jettability poor during the inkjet printing process, and there may occur squiggle, omission, insufficiency in the suitable range of printing voltage, or the like during the ink jetting process.

If the content of phenoxyethyl acrylate is less than 55% by weight, there is a Risk that the adhesiveness to the resin substrate may be decreased. On the other hand, if the content is greater than 93% by weight, there is a risk that the UV-curability of the UV-curable ink may be deteriorated, and the glass transition temperature Tg of the printed layer may be lowered, resulting in tack (tackiness) in the printed layer.

Furthermore, the UV-curable ink may contain, as the polyfunctional monomer, for example, a monomer having a cyclic structure.

Examples of the polyfunctional monomer having a cyclic structure are as previously described.

Furthermore, examples of a monomer having high inkjet suitability among these are also previously described.

As the monofunctional monomer and the polyfunctional monomer, if the monomers having a cyclic structure as described above are mixed, adhesiveness of the printed layer (the above-described cured product) to the resin substrate can be enhanced. This is also previously described.

As the monofunctional monomer and the polyfunctional monomer, monomers which do not have a cyclic structure can also be used, if necessary.

Examples of the polyfunctional monomer which does not have a cyclic structure are as previously described.

Examples of the monofunctional monomer which does not have a cyclic structure are also as previously described.

Furthermore, in the case where higher stretchability is required, irrespective of the presence or absence of cyclic structure, it is preferable to use a bifunctional monomer as the polyfunctional monomer.

Among these, the UV-curable monomer preferably has a molecular weight of less than 2000 in order to secure long-term print image stability and to be finished as a low-viscosity ink, and more preferably does not contain a monomer having a molecular weight of 2000 or higher, as the UV-curable monomer.

The UV-curable ink can also contain pigments of various colors, a polymerization initiator, a dispersant and the like, in addition to the UV-curable monomer.

As the pigment component, pigments of achromatic colors, such as carbon black, titanium oxide and calcium carbonate, or organic pigments of chromatic colors can be used. Examples of the organic pigments include insoluble azo pigments such as Toluidine Red, Toluidine Maroon, Hanza Yellow, Benzidine Yellow and Pyrazolone Red; soluble azo pigments such as Lithol Red, Helio Bordeaux, Pigment Scarlet and Permanent Red 2B; derivatives derived from vat dyes such as Alizarine, indanthrone and Thioindigo Maroon; phthalocyanine-based organic pigments such as Phthalocyanine Blue and Phthalocyanine Green; quinacridone-based organic pigments such as Quinacridone Red and Quinacridone Magenta; perylene-based organic pigments such as Perylene Red and Perylene Scarlet; pyranthrone-based organic pigments such as Pyranthrone Red and Pyranthrone Orange; thioindigo-based pigments; condensed azo-based organic pigments; benzimidazolone-based organic pigments; quinophthalone-based organic pigments such as Quinophthalone Yellow; isoindoline-based organic pigments such as Isoindoline Yellow; and other pigments such as Flavanthrone Yellow, Acylamide Yellow, nickel azo yellow, copper azomethine yellow, perynone orange, anthrone orange, dianthraquinonyl red, and dioxazine violet.

Examples of the organic pigments, as exemplified in their Color Index (C.I.) numbers, include C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180 and 185; C.I. Pigment Orange 16, 36, 43, 51, 55, 59 and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238 and 240; C.I. Pigment Violet 19, 23, 29, 30, 37, 40 and 50; C.I. Pigment Blue 15, 15:1, 15.3, 15:4, 15:6, 22, 60 and 64; C.I. Pigment Green 7 and 36; C.I. Pigment Brown 23, 25, and 26; and the like.

Specific examples of carbon black include "SPECIAL BLACK 350, 250, 100, 550, 5, 4, 4A and 6", "PRINTEX U, V, 140U, 1400V, 95, 90, 85, 80, 75, 55, 45, 40, P, 60, L6, L, 300, 30, 3, 35, 25, A and G", all manufactured by Degussa AG; "REGAL 400R, 660R, 330R and 250R", "MOGUL E and L", all manufactured by Cabot Corporation; "MA 7, 8, 11, 77, 100, 100R, 100S, 220 and 230", "#700, #2650, #2600, #200, #2350, #2300, #2200, #1000, #990, #980, #970, #960, #950, #900, #850, #750, #650, #52, #50, #41, #45, #45L, #44, #40, #33, #332, #30, #23, #20, #10, #5, CF9, #95 and #260", all manufactured by Mitsubishi Chemical Corporation; and the like.

Specific examples of titanium oxide include "TIPAQUE CR-50, 50-2, 57, 80, 90, 93, 95, 953, 97, 60, 60-2, 63, 67, 58, 58-2, 85", "TIPAQUE R-820, 830, 930, 550, 630, 680, 670, 580, 780, 780-2, 850, 855", "TIPAQUE A-100, 220", "TIPAQUE W-10", "TIPAQUE PF-740, 744", "TTO-55(A), 55(B), 55(C), 55(D), 55(S), 55(N), 51(A), 51(C)", "TTO-S-1, 2", "TTO-M-1, 2", all manufactured by Ishihara Sangyo Co., Ltd.; "TITANIX JR-301, 403, 405, 600A, 605, 600E, 603, 805, 806, 701, 800, 808", "TITANIX JA-1, C, 3, 4, 5", all manufactured by Tayca Corporation; "TI-PURE R-900, 902, 960, 706, 931" manufactured by DuPont Company; and the like.

Among the pigments, quinacridone-based organic pigments, phthalocyanine-based organic pigments, benzimidazolone-based organic pigments, isoindolinone-based organic pigments, condensed azo-based organic pigments, quinophthalone-based organic pigments, isoindoline-based organic pigments, and the like are preferred because of their excellent light fastness.

The organic pigments are preferably micropigments having an average particle size of 10 to 150 nm as measured by laser scattering. If the average particle size of the pigment is less than 10 nm, there is a risk that a smaller particle size may cause deterioration of light fastness.

On the other hand, if the average particle size is greater than 150 nm, it becomes difficult to stably maintain the dispersed state, and precipitation of pigment is prone to occur.

Micronization of the organic pigment can be carried out, for example, by the following method.

That is, firsts an organic pigment, a water-soluble inorganic salt in an amount three-fold the weight of the organic pigment, and a water-soluble solvent are mixed to prepare a clay-like mixture. Subsequently, the mixture is strongly kneaded with a kneader or the like to micronize the particles, and then introduced into water and stirred with a high speed mixer or the like, to obtain a slurry. Then, the slurry is repeatedly filtered and washed with water, to remove the water-soluble inorganic salt and the water-soluble solvent. Thus, a micronized organic pigment can be obtained.

In the micronization process described above, a resin, a pigment dispersant and the like may be added. The water-soluble inorganic salt is used as a crushing aid, and specifically, for example, sodium chloride, potassium chloride or the like can be used. These inorganic salts are used in an amount approximately three-fold or more the weight of the organic pigment, and preferably 20-fold or less the weight of the organic pigment. If the amount of the inorganic salt is less than three-fold the weight of the organic pigment, there is a risk that an organic pigment having a desired particle size cannot be obtained. On the other hand, if the amount is greater than 20-fold the weight of the organic pigment, the time taken for the washing treatment in the subsequent processes is increased, and at the same time, and the substantial throughout of the organic pigment is decreased, thus the production efficiency becoming poor.

The water-soluble solvent is used in order to make a good clay-like state of the organic pigment and the water-soluble inorganic salt, and thus to perform crushing sufficiently and efficiently. The water-soluble solvent has a risk of becoming susceptible to evaporation when the temperature increases upon kneading. For that reason, from the viewpoint of safety, it is preferable to use a solvent having a boiling point as high as 120° C. to 250° C., as the water-soluble solvent.

Specifically, as the water-soluble solvent, 2-(methoxyethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low molecular weight polypropylene glycol and the like can be used.

The UV-curable ink can contain the pigment in an amount of, for example, 3 to 30% by weight in the composition. A UV-curable ink containing the pigment within this range has a sufficient color density, and also can exhibit excellent light fastness.

The UV-curable ink preferably contains a pigment dispersant. In this case, the dispersibility of the pigment in the UV-curable ink can be enhanced, and at the same time, the storage stability of the UV-curable ink can be enhanced.

As the pigment dispersant, for example, hydroxyl group-containing carboxylic acid esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethane, modified polyacrylate, polyether ester type anionic active agents, naphthalenesulfonic acid-formalin condensate salts, aromatic sulfonic acid-formalin condensate salts, polyoxyethylene alkylphosphoric acid esters, polyoxyethylene nonyl phenyl ether, stearylamine acetate and the like can be used.

Detailed specific examples of the dispersant include, for example, "Anti-Terra-U (polyaminoamide phosphoric acid salts)", "Anti-Terra-203/204 (high molecular weight polycarboxylic acid salts)", "Disperbyk-101 (polyaminoamide phosphoric acid salt and acid ester), 107 (hydroxyl group-containing carboxylic acid ester), 110, 111 (copolymers containing acidic groups), 130 (polyamide), 161, 162, 163, 164, 165, 166, 170 (high molecular weight copolymers)", "400", "Bykumen (high molecular weight unsaturated acid esters)", "BYK-P104, P105 (high molecular weight unsaturated acid polycarboxylic acids)", "P104S, 240S (high molecular weight unsaturated acid polycarboxylic acids and silicone-based)", "Lactimon (long-chain amines and unsaturated acid polycarboxylic acids and silicone)", all manufactured by BYK Chemie GmbH, and the like.

Furthermore, "EFKA 44, 46, 47, 48, 49, 54, 63, 64, 65, 66, 71, 701, 764, 766", "EFKA-Polymer-100 (modified polyacrylate), 150 (aliphatic modified polymer), 400, 401, 402, 403, 450, 451, 452, 453 (modified polyacrylate), 745 (copper phthalocyanine-based)", all manufactured by Efka Chemicals BV; "FLOWLEN TG-710 (urethane oligomer), "FLOWNON SH-290, SP-1000", "POLYFLOW No. 50E, No. 300 (acrylic copolymers)", all manufactured by Kyoeisha Chemical Co., Ltd.; "DISPARLON KS-860, 873SN, 874 (polymeric dispersants), #2150 (aliphatic polybasic carboxylic acid), #7004 (polyether ester type), all manufactured by Kusumoto Chemical, Ltd.; and the like, may be mentioned. Also, "DEMOL RN, N (naphthalenesulfonic acid-formalin condensate sodium salts), MS, C, SN-B (aromatic sulfonic acid-formalin condensate sodium salts), EP", "HOMOGENOL L-18 (polycarboxylic acid type polymer)", "EMULGEN 920, 930, 931, 935, 950, 985 (polyoxyethylene nonyl phenyl ethers)", "ACETAMIN 24 (coconut amine acetate), 86 (stearylamine acetate)", all manufactured by Kao Corporation; "SOLPERSE 5000 (phthalocyanine ammonium salt-based), 13940 (polyesteramine-based), 17000 (fatty acid amine-based), 24000 GR, 32000, 33000, 39000, 41000, 53000", all manufactured by Avecia, Ltd.; "NIKOL T106 (polyoxyethylene sorbitan monooleate), MYS-IEX (polyoxyethylene monostearate), and Hexagline 4-0 (hexaglyceryl tetraoleate), all manufactured by Nikko Chemicals Co. Ltd.; "AJISPER-PB 821, 822, 824" manufactured by Ajinomoto Fine-Techno Co., Inc.; and the like, may be mentioned.

The dispersant is preferably contained in the composition of the UV-curable ink in an amount of 0.1 to 10% by weight. Thereby, dispersibility of the pigment and storage stability of the ink can be further enhanced. In order to further enhance the dispersibility and storage stability, the dispersant is preferably incorporated at the time of dispersing the pigment.

It is preferable that the UV-curable ink contains a surface conditioning agent in order to enhance the wettability against the resin substrate. Specific examples of the surface conditioning agent include, for example, "BYK-300, 302, 306, 307, 310, 315, 320, 322, 323, 325, 330, 331, 333, 337, 340, 344, 370, 375, 377, 350, 352, 354, 355, 356, 358 N, 361 N, 357, 390, 392, UV3500, UV3510, UV3570", manufactured by BYK Chemie GmbH; "TEGORAD-2100, 2200, 2250, 2500, 2700", manufactured by Tego Chemie GmbH; and the like. These surface conditioning agents can be used individually or in combination of two or more species, if necessary. The surface conditioning agent is preferably contained in the composition of the UV-curable ink in an amount of 0.001 to 1% by weight.

The UV-curable ink can contain a photopolymerization initiator.

As the photopolymerization initiator, it is preferable to incorporate oligo(2-hydroxy-2-methyl-1-(4-(1-methylvinyl) phenyl)propa none and 2,4,6-trimethylbenzoyldiphenylphosphine oxide. Particularly, in the case where the UV-curable ink contains both of them, the curing rate is good, and a printed layer free of blocking can be formed.

Here, the term blocking refers to a phenomenon in which the printed layer conglutinates when contacted with another member, and in some cases, the printed layer is transferred. It is conceived that this occurs when a relatively large amount of an unreacted monomer or a dimer or trimer generated due to the termination of polymerization in a low molecular weight state, remains behind in the printed layer.

The photopolymerization initiator is generally classified into the intramolecular bond opening type and the intermolecular hydrogen withdrawing type. Oligo(2-hydroxy-2-methyl-1-(4-(1-methylvinyl)phenyl)propa none is of the intramolecular bond opening type, and inter alia, is classified as an acetophenone-based initiator. This is characterized by rapid polymerization rate, less yellowing caused by photoacidification, good storage stability and the like, compared to the intermolecular hydrogen withdrawing type.

2,4,6-Trimethylbenzoyldiphenylphosphine oxide has an absorption peak in a wavelength range of 350 nm to 395 nm, and uses light having a longer wavelength compared to oligo (2-hydroxy-2-methyl-1-(4-(1-methylvinyl)phenyl)propanone. Thus, the penetration depth of the irradiated light is increased, and curing in the interior of the printed layer can be promoted.

For the UV-curable ink, the photopolymerization initiator is preferably added in an amount of 2 to 20 parts by weight, relative to 100 parts by weight of the UV-curable monomer. If the amount is less than 2 parts by weight, the curing rate may be significantly decreased. On the other hand, if the photopolymerization initiator is added in an amount exceeding 20 parts by weight, the curing rate is already hardly subject to improvement. Also, it becomes difficult to completely dissolve the photopolymerization initiator in the ink, and there is a risk that, even if solubilization is achieved by heating, the viscosity is increased, and it may become difficult for the ink to be used as an inkjet ink. The absorption spectrum of the photopolymerization initiator can be measured, for example, by dissolving the photopolymerization initiator in acetonitrile to a concentration of 0.1% by weight, and using a 1-cm quartz cell and a spectrophotometer (U-3300 manufactured by Hitachi, Ltd.). The absorption peak refers to a peak having an absorbance of 0.5 or greater under the measurement conditions. Many of the acylphosphine oxide-based photopolymerization initiators have an absorption peak having an intensity of 0.5 or greater in the wavelength range of 350 nm to 395 nm under the measurement conditions.

Next, it is preferable that the UV-curable ink has a viscosity adjusted to 15 to 35 mPa·s at normal temperature.

In the case where the viscosity of the UV-curable ink is out of the range of 15 to 35 mPa·s, there is a risk that printing by inkjet printing may become difficult. With regard to the inkjet printing process, for example, it is conceived appropriate to generally heat the UV-curable ink to decrease the viscosity to about 10 mPa·s and perform jetting, so as to stably jet liquid microdroplets of the UV-curable ink of a volume of 10 pl or less. However, if the viscosity of the UV-curable ink is higher than 35 mPa·s, there is a risk that during the inkjet printing process, there comes a necessity to heat the UV-curable ink to a temperature near 50° C., and thermal deterioration of the printhead member of the inkjet printing apparatus or thermal reaction of the UV-curable ink itself may occur. Also, when PEA is used for the UV-curable ink as the main component of the monofunctional monomer, the viscosity of PEA is about 10 mPa·s, and thus it may become difficult to adjust the viscosity to the range of 15 to 35 mPa·s.

The display panel has a resin substrate formed from polycarbonate, polyethylene terephthalate or the like, and a printed layer formed on at least a part of the resin substrate. The printed layer can be formed through inkjet printing, by performing printing on at least a part of the resin substrate using the UV-curable ink, and curing the UV-curable ink.

It is preferable that the resin substrate is light transmissive, and the printed layer has transmissive parts which transmit visible light, and opaque parts which do not transmit visible light. It is also preferable that the display panel is used as a backlight type display panel, in which the transmissive parts in the printed layer are brightly displayed by illuminating light on the display panel from the rear surface on the opposite side of the surface viewed by users (graphical design surface).

In this case, the printed layer in the display panel can maximally manifest its excellent graphical design properties.

Furthermore, in this case, the display panel can be suitably used as, for example, a display panel for instrument gauges in the dashboard facing the driver's seat in the interior of an automobile, or as a display panel for air-conditioners or the like.

A display panel for automotive instrument gauges is shown in FIG. 1 and FIG. 2 as an exemplary use as a backlight type display panel. In this display panel (display panel for automotive instrument gauges), a printed layer including scales or characters or a non-printed layer formed on the resin substrate forms transmissive parts, and the light from the light source disposed on the rear surface side of the resin substrate can make the graphical design of the transmissive parts to be brightly displayed. In the parts other than the transmissive parts on the resin substrate, a printed layer formed from a black UV-curable ink is formed, and this black printed layer forms opaque parts.

The transmissive parts and the opaque parts can be formed by adjusting the color, thickness and print density of the printed layer. The transmissive parts can be formed, for example, by making the thickness of the printed layer smaller, decreasing the print density, or making the color density lower. On the other hand, the opaque parts can be formed, for example, by making the thickness of the printed layer larger, or laminating a printed layer formed from a black UV-curable ink.

Furthermore, in the display panel of the invention, a transparent overcoat layer can be formed on the outermost layer of the surface on the side viewed by users (graphical design surface), for the purpose of delustering the surface. The overcoat layer can be formed by inkjet printing, screen printing or the like.

According to a fifth aspect of the present invention, there is a composition of ink used by a method for producing a display panel having a resin substrate and a printed layer formed on at least a part of the resin substrate, the method comprising jetting, by means of inkjet printing, a UV-curable ink containing UV-curable monomers which are polymerized and cured by UV irradiation, on at least a part of the resin substrate; and irradiating the UV-curable ink with UV to cure the UV-curable ink, and to thereby form a printed layer; wherein the UV-curable ink contains monofunctional monomers and a polyfunctional monomer as the UV-curable monomers, and the UV-curable ink contains in the composition at least vinylcaprolactam and N-acryloyloxyethyl hexahydrophthalimide as the monofunctional monomers.

DESCRIPTION OF THE PREFERRED EMBODIMENTS

Figure 1:
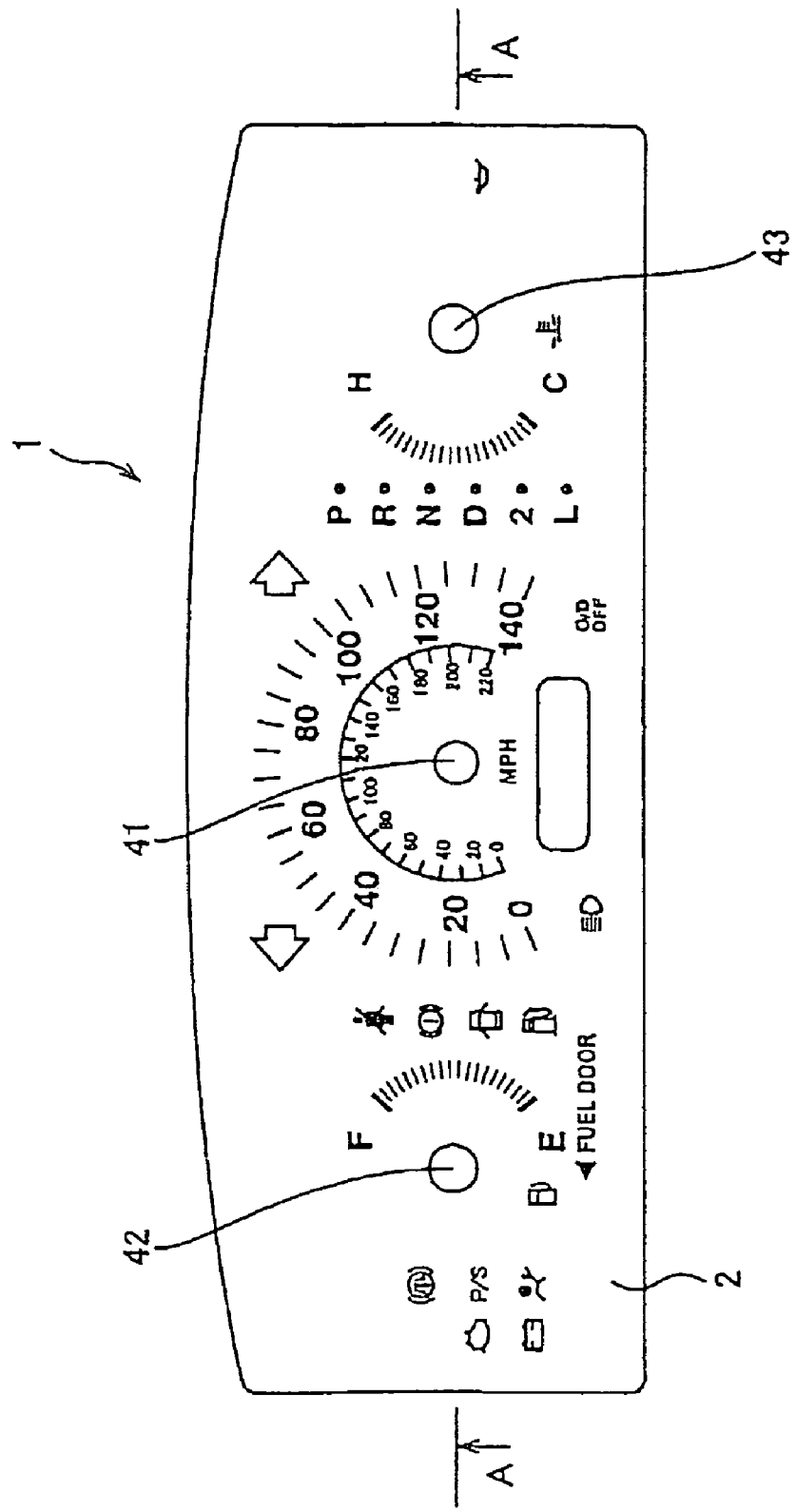
FIG. 1 is a front view of a display panel according to Exemplary Embodiment 1.

Hereinafter, preferred embodiments of the present invention will be described.

Embodiment 1

In the present embodiment, as shown in Table 1, a plurality of UV-curable inks having different compositions were prepared, and these were used in printing on a resin substrate to evaluate the characteristics as the inks for display panels.

First, as shown in the following Table 1, a plurality of UV-curable inks having different compositions (sample X1 to sample X3) was prepared.

These inks respectively contain a monofunctional monomer, a polyfunctional monomer (bifunctional monomer) and a pigment in the composition shown in Table 1. Each ink also contains a polymerization initiator, a dispersant and the like in addition to them. The components other than the UV-curable monomers and the pigment were contained in almost the same amount in each of the inks.

Next, a resin substrate formed from polycarbonate and having a thickness of 0.5 mm was provided. Printing was performed on this resin substrate by inkjet printing, using each of the UV-curable inks (samples X1 to X3), the inks were cured by UV irradiation, and thus a printed layer formed from the cured products of the UV-curable inks was formed.

Inkjet printing was conducted such that a Ca4 printhead manufactured by TOSHIBA TEC Corporation was filled with each of the UV-curable inks, and the UV-curable ink was heated to a temperature of 45° C. inside the printhead, to attain an ink viscosity at the time of discharge of about 10 mPa·s. For the inkjet printing, while the liquid droplet volume was set to 12 pl, and the printhead scanning rate was set to about 20 m/min, a print output of 600 dpi×1200 dpi was printed in an eight-pass ink drop print mode, to thus form the printed layer formed from ink cured products. As for the ink curing, a UV exposure machine accessory to an inkjet apparatus was used, with the conditions adjusted to a peak wavelength of 365 nm and an illuminance of 1000 mW.

The illuminance was measured using the N-1 illuminance meter (for measurement at a wavelength of 365 nm) manufactured by GS Yuasa Corp.

In the present embodiment, the printed layer formed on the resin substrate can be used as a substitute of the print output printed and formed by conventional silk screen process printing, and the printed layer is generally not made as a transmissive image at the inkjet print density used in paper printing, signboards and the like. Therefore, printing was performed such that the print densities of the respective colors would respectively be transmission densities such as 2.0 to 5.0 for black, 0.4 to 0.6 for cyan, 0.7 to 1.0 for magenta, and 0.1 to 0.2 for yellow. These measurements were made using a transmission densitometer manufactured by X-RIGHT, Inc.

The curability of the UV-curable ink is known to vary with the intensity of UV illuminance, irradiation energy (integrated amount of light), the amount of ink dropped by inkjet in one time, and the transmission density of the ink itself.

As the printing conditions during the production of display panel of the present embodiment, the following suitable conditions can be used.

That is, UV irradiation can be carried out at 600 mW to 1500 mW. This is because, if the UV illuminance exceeds 1500 mW, there is a risk of expansion of the resin substrate under heat, or deterioration of the resin substrate by UV, which may result in yellowing. On the other hand, an illuminance of less than 600 mW is insufficient because there is a risk that the UV intensity for transmitting to the interior may be insufficient, causing insufficient curing.

Furthermore, in general, the irradiation time is determined by the printhead operation speed at the main operating time, because the UV lamp disposed in parallel with the inkjet printhead repeats an operation of passing over the ink instantly after ink dropping.

The maximum operation speed is determined by the frequency of the printhead. In view of the productivity and curability, the integrated amount of light in one-pass of the main operation can be set to 100 to 300 mJ. The dropping amount of ink is set such that the maximum droplet volume is set to 12 pl, in order to suppress deterioration of the image quality of the print output. If the liquid droplet volume is greater than 20 pl, there is a risk that for example, when inkjet printing is conducted along a straight line, the end section of the line may bleed because of wet spreading upon the impact of the ink droplet on the resin substrate. To realize a line resolution of the silk screen process level, a liquid droplet volume of 12 pl or less is suitable.

As for the transmission density of the ink itself, the ink density of black color, which has the poorest UV transmissibility, serves as the reference point. If the ink density of black is set low, the curability would be remarkably improved, but it would be difficult to manifest a desired transmission density unless printing is performed repeatedly a number of times. On the other hand, if the pigment ratio is increased, curing may be significantly deteriorated. Therefore, the transmission density of a printed layer having a thickness of 10 μm is suitably 1.05 to 1.25.

That is, in the case of producing a display panel in which the backlight such as an LED lamp is disposed on the rear side, for example, as in the indicator of an automotive meter, it is necessary to form transmissive parts where light is transmitted, and opaque parts where light is hardly transmitted. Realization of this opaqueness requires a transmission density of 4.0. Therefore, when printing is performed as described above with an ink having a transmission density of 1.0 to a thickness of 10 μm, it is necessary to form a printed layer having a thickness of 40 μm by repeating the printing process at least four or more times. Even if printing is repeated four times, there is a risk that it may be difficult to sufficiently form opaque parts, upon considering the unevenness of liquid droplets. Furthermore, when a printed layer having a thickness of 50 μm is formed by lamination printing five or more times, a sufficient density may be achieved as the opaque parts, but there is a risk that the thickness of the printed layer may be increased too much, resulting in shrinkage by curing of the printed layer or generation of large warpage in the printed layer. Furthermore, in this case, there is a risk that the difference between concavity and convexity in the opaque parts and transmissive parts may increase, and thus the visual quality of the external appearance may be deteriorated. In addition, when an overcoat layer for delustering the surface or for imparting hardcoat properties to the surface of the display panel is formed by silk screen process printing, it may become difficult for the ink to penetrate through the irregular parts.

Therefore, it is important that the black ink achieves a transmission density of 4.0 at a thickness of 40 μm or less, and in order to achieve this, it will be suitable that the transmission density of a printed layer having a thickness of 10 μm is 1.05 to 1.25.

Under the printing conditions as described above, printing was performed with each of the UV-curable inks (sample X1 to sample X3) on a resin substrate, and thus there were obtained three types of printed substrates on which printed layers formed from the cured products of the UV-curable inks were formed.

Subsequently, an evaluation was performed for each of the printed substrates in terms of moldability, processability, and the durability of the printed layer. Specifically, the following evaluation tests were performed.

[Stretchability]

From each of the printed substrates, a dumbbell-shaped specimen as prescribed in JIS K6257 (width 5 mm, thickness of the printed layer 20 to 100 μm, and thickness of the substrate 0.5 mm) was punched. This dumbbell-shaped specimen was stretched by a tensile testing machine at a tensile speed of 50 nm/min. Then, the rate of elongation (draw ratio; %) of the distance between marked points at the time point where cracks generated in the printed layer, was measured. The measurement was performed under the conditions of a measurement temperature of 180° C., a distance between chucks of 40 mm, and an initial distance between marked points of 40 μm. The results are presented in Table 1.

[Adhesiveness]

The evaluation of adhesiveness was performed by means of the cross-cut peeling test as prescribed in JIS D2020. Specifically, first, the printed layer in each of the printed substrates was cut lengthwise and breadthwise to form cross-cuts about 1 mm on each side. Subsequently, cellophane tape was adhered to the printed layer inserted with the cross-cuts, and then the tape was peeled off. The case where the printed layer did not peel along with the tape, was graded as "O", while the case where peeling of the printed layer along with the tape was observed, was graded as "x". The results are presented in Table 1.

[Curability]

The printed layer of each of the printed substrates was pressed with the ball of a finger, and then it was visually inspected as to whether or not the fingerprint mark was left on the printed layer. The case where the fingerprint mark could not be confirmed by visual inspection, was graded as "O", while the case where the fingerprint mark could be confirmed, was graded as "x". The results are presented in Table 1.

[Pencil Hardness Test]

Figure 3:
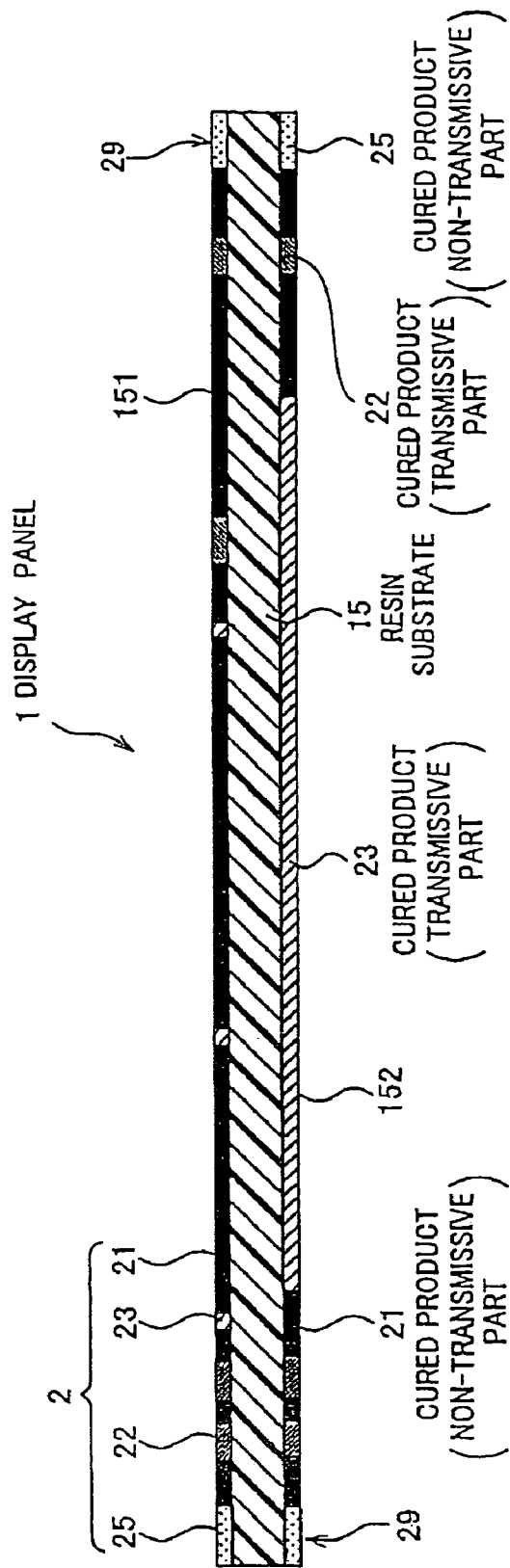
FIG. 3 is an explanatory diagram showing the cross-sectional structure of a resin substrate according to Exemplary Embodiment 1, having a printed layer formed therein.

Each of the printed substrates was disposed on a hot plate set at a temperature of 90° C., and the printed layer was heated to about 90° C. Subsequently, the pencil hardness test as prescribed in JIS K 5400 (version of year 2004) was performed on the hot plate, to measure the pencil hardness of the printed layer. The results are presented in Table 1.

thus has a structure in which the central part is more protruded than the periphery. FIG. 3 shows a cross-sectional view of the display panel 1 before it has been subjected to molding processing.

Hereinafter, the display panel of the present embodiment will be described in more detail.

Figure 2:
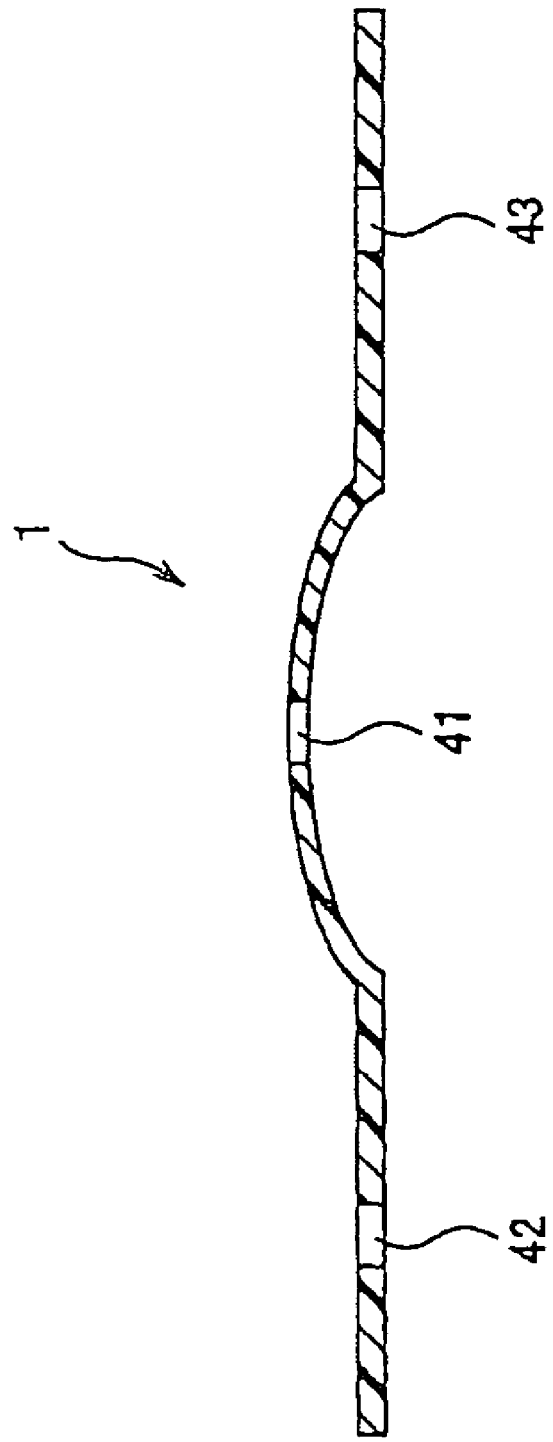
FIG. 2 is a cross-sectional view of the display panel according to Exemplary Embodiment 1 (cross-sectional view viewed along the line A-A in FIG. 1)

The display panel 1 of the present embodiment has, as shown in FIGS. 1 to 3, a light transmissive resin substrate 15, and a printed layer 2 formed by lamination on the graphical design surface 151 of the resin substrate.

As can be seen from FIG. 3, the printed layer 2 has two cured products having different pencil hardness values. The cured products 21, 22 and 23 have the same pencil hardness value, while the cured product 25 has higher (hard) pencil hardness compared to the cured products 21, 22 and 23. In the printed layer 2, the cured products 22 and 23 form transmissive parts capable of transmitting visible light, and thus form characters, symbols or the like in the display panel. The cured product 21 forms black opaque parts which do not transmit

TABLE 1

| | | UV-curable ink | | | | | | | | | |
|---|---|---|---|---|---|---|---|---|---|---|---|
| | | Composition (parts by weight) | | | | | | Cured product | | | |
| | | Monofunctional monomer | | | Bifunctional monomer | | | | | | |
| Sample No. | Type of printhead (color) | Phenoxyethyl acrylate | N-acryloyloxyethyl hexahydrophthalimide | Vinylcaprolactam | Bisphenol A diacrylate | Pigment | Viscosity | Stretchability (%) | Adhesiveness | Curability | Pencil hardness |
| Sample X1 | C | 79.4 | 5.2 | 15.4 | 3 | 2 | 20-25 | 150 | O | O | 2B |
| | Y | | | | | 5 | 20-25 | 150 | O | O | 2B |
| | K | | | | | 3 | 20-25 | 150 | O | O | 2B |
| | M | | | | | 7 | 25-30 | 150 | O | O | 2B |
| Sample X2 | C | 78.9 | 5.3 | 15.8 | 5 | 2 | 20-25 | 100 | O | O | HB |
| | Y | | | | | 5 | 20-25 | 100 | O | O | HB |
| | K | | | | | 3 | 20-25 | 100 | O | O | HB |
| | M | | | | | 7 | 25-30 | 100 | O | O | HB |
| Sample X3 | C | 77.8 | 5.5 | 16.7 | 10 | 2 | 25-30 | 60 | O | O | 2H |
| | Y | | | | | 5 | 25-30 | 60 | O | O | 2H |
| | K | | | | | 3 | 25-30 | 60 | O | O | 2H |
| | M | | | | | 7 | 25-30 | 60 | O | O | 2H |

As can be seen from Table 1, samples X1 to X3 all exhibited excellent adhesiveness, and also exhibited excellent curability to the extent that no surface tackiness was generated. On the other hand, the samples exhibited respectively different stretchability and pencil hardness values.

Next, a display panel is manufactured using each of the UV-curable inks produced as described above.

In the present embodiment, an instrument dial plate for vehicles is produced as the display panel 1 (see FIG. 1).

As shown in FIGS. 1 to 3, the display panel 1 of the present embodiment has a resin substrate 15, and a printed layer 2 formed on at least a part of this resin substrate 15 by inkjet printing.

The printed layer 2 includes cured products 21, 22, 23 and 25 of UV-curable inks each containing a UV-curable monomer which is polymerized and cured by UV irradiation. Furthermore, the printed layer 2 has at least two cured products 21, 22, 23 and 25, having different pencil hardness values.

As shown in FIGS. 1 and 2, the display panel 1 of the present embodiment is an instrument dial plate for vehicles. FIG. 1 is a front view of the display panel of the present embodiment. FIG. 2 is a cross-sectional view of the display panel 1 shown in FIG. 1. As can be seen from FIG. 2, the display panel 1 has been subjected to molding processing, and visible light. The cured product 25, which has higher pencil hardness compared to the other cured products 21, 22 and 23, also forms black opaque parts. The cured product 21 and the cured product 25 have the same color (black), and are arranged adjacently to each other, the boundaries between the two can be hardly distinguished from the external appearance. The cured product 25 is also formed at the pressed part 29 where the display panel is pressed by another member.

In the present embodiment, each of the cured products 21, 22, 23 and 25 is formed from a UV-curable ink (the aforementioned sample X1 or X2) containing a monofunctional monomer and a polyfunctional monomer as UV-curable monomers.

The cured products 21, 22 and 23 are respectively formed from a low concentration polyfunctional monomer ink containing the polyfunctional monomer in an amount of 5 parts by weight or less in 100 parts by weight of the UV-curable monomers. On the other hand, the cured product 25 is formed from a high concentration polyfunctional monomer ink (the aforementioned sample X3) containing the polyfunctional monomer in an amount of 10 parts by weight or more in 100 parts by weight of the UV-curable monomers.

The cured products 21, 22, 23 and 25 are each formed from a UV-curable ink having a color selected from black, magenta, cyan and yellow, or from a mixture of such UV-curable inks. In the present Example, the printed layer 2 having these cured products 21, 22, 23 and 25 is formed on both the graphical design surface 151 side and the rear surface 152 side of the resin substrate 15.

Figure 4:
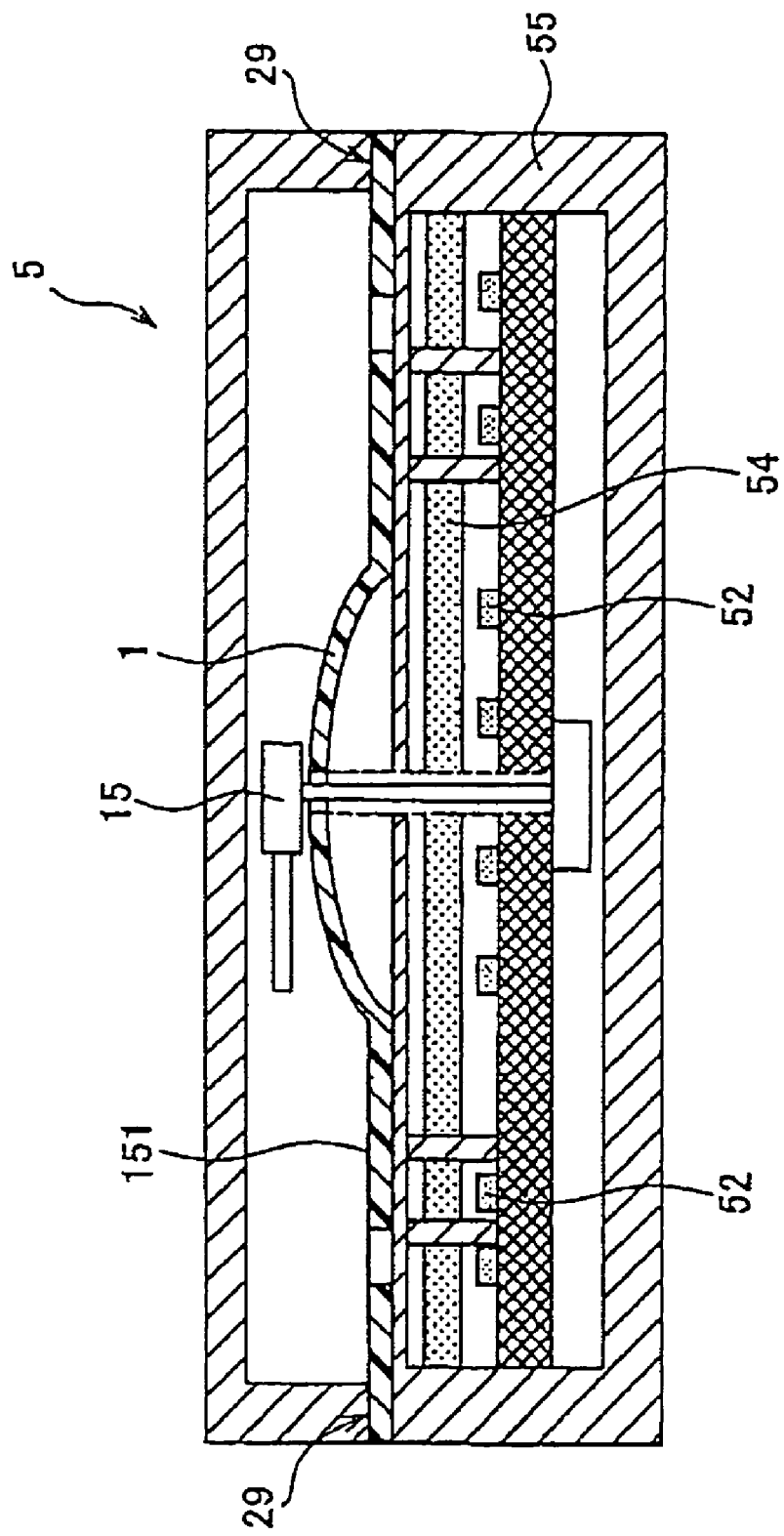
FIG. 4 is an explanatory diagram showing the cross-sectional structure of the display panel according to Exemplary Embodiment 1, in a state of being disposed inside an instrument casing for vehicles.

Furthermore, as shown in FIG. 4, the display panel 1 of the present embodiment is held in a casing 55, together with a pointer 51, a light source (LED lighting) 52, a circuit board 53, a light diffuser plate 54 and the like, and the assembly is used as an instrument gauge 5 for vehicles. If the display panel 1 is to be disposed inside the casing 55, the edge part (pressed part 29) of the display panel 1 is inserted into the casing (the aforementioned other member) 55, to fix the display panel 1.

In the display panel 1, transmissive parts 22 and 23 which transmit visible light when light is irradiated from the rear surface 152 on the opposite side of the graphical design surface 151, and opaque parts 21 and 25 which do not transmit visible light, are formed.

The transmissive parts 22 and 23 can be colored to have desired colors by appropriately mixing UV-curable inks respectively having black, magenta, cyan and yellow colors. In the present Example, the transmissive parts 22 and 23 indicate a fuel level gauge, a direction indicator, a speedometer gauge, a gear indicator and the like. Furthermore, by means of the light from the light source disposed on the rear surface 152 side of the display panel 1 or the like, the transmissive parts 22 and 23 can be brightly displayed even in dark.

The opaque parts 21 and 25 can be formed, for example, using the UV-curable inks of black.

The display panel 1 of the present embodiment shows a convex-shaped structure with its approximately central part protruded toward the graphical design surface 151 side (see FIG. 2).

Next, the method for producing the display panel of the present embodiment will be described.

In the present embodiment, the cured products 21, 22, 23 and 25 are formed through inkjet printing, by jetting at least two UV-curable inks which will attain different pencil hardness after curing, on at least a part of the resin substrate 15, and irradiating the UV-curable inks with UV to cure the UV-curable inks (see FIG. 3). Thereby, as shown in FIG. 3, a display panel 1 having a resin substrate 15, and a printed layer 2 including cured products 21, 22, 23 and 25 formed on the resin substrate 15, can be produced.

The display panel 1 was produced by drawing the graphical design image as shown in FIG. 1 using a computer, printing on the basis of this graphical design image, the image on the resin substrate by an inkjet method using UV-curable inks of full colors, curing the inks, and then performing molding.

In the present embodiment, the following is used as the production apparatus for the display panel. That is, for the drawing of images, for example, the image processing software manufactured by Adobe, Inc. is used. As the printing apparatus, a UV-curable type inkjet apparatus (inkjet printhead, UV-irradiating light source simultaneous driving type UJF605C manufactured by Mimaki Engineering Co., Ltd., maximum resolution 1200 DPI) is used.

Figure 5:
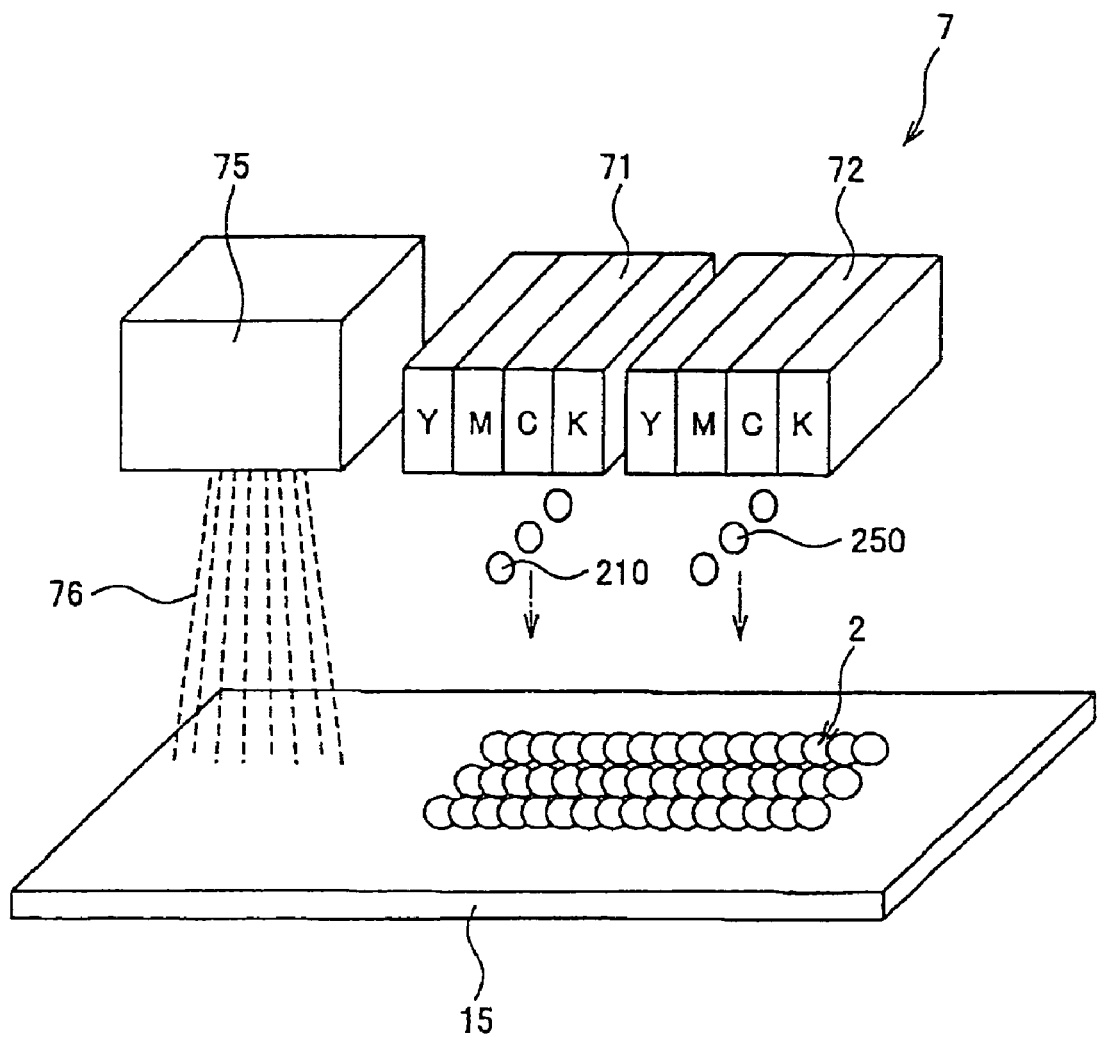
FIG. 5 is an explanatory diagram schematically showing the configuration of a printing apparatus according to Exemplary Embodiment 1.
Figure 6:
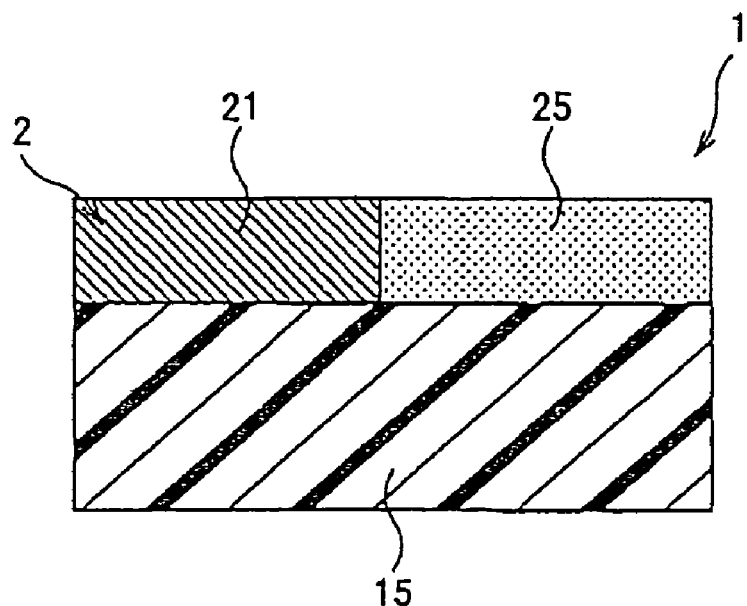
FIG. 6 is an explanatory diagram showing a portion of the cross-sectional structure of a display panel in which a printed layer is formed on a resin substrate, with at least two cured products having different pencil hardness values being disposed in parallel in approximately the same plane.
Figure 7:
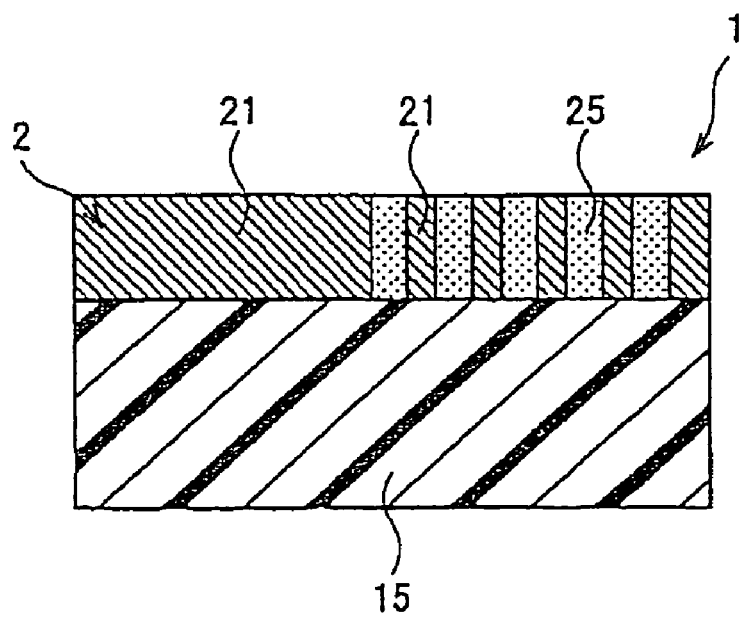
FIG. 7 is an explanatory diagram showing a portion of the cross-sectional structure of a display panel in which a printed layer is formed on a resin substrate, with at least two cured products having different pencil hardness values being disposed alternately at a low pitch and in parallel in approximately the same plane.
Figure 8:
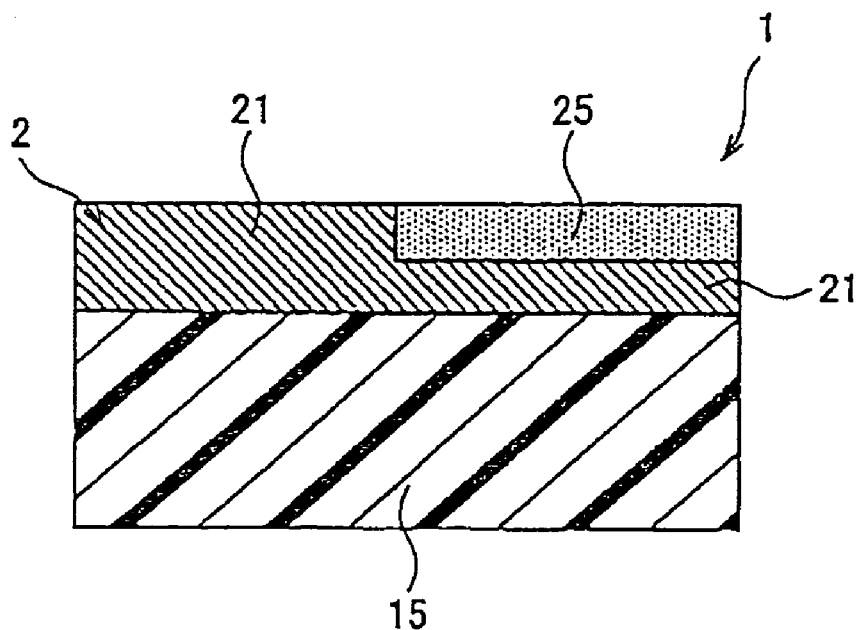
FIG. 8 is an explanatory diagram showing the cross-sectional structure of a display panel in which a printed layer is formed on a resin substrate, with a cured product having higher pencil hardness being disposed in a laminated state on a cured product having lower pencil hardness.
Figure 9:
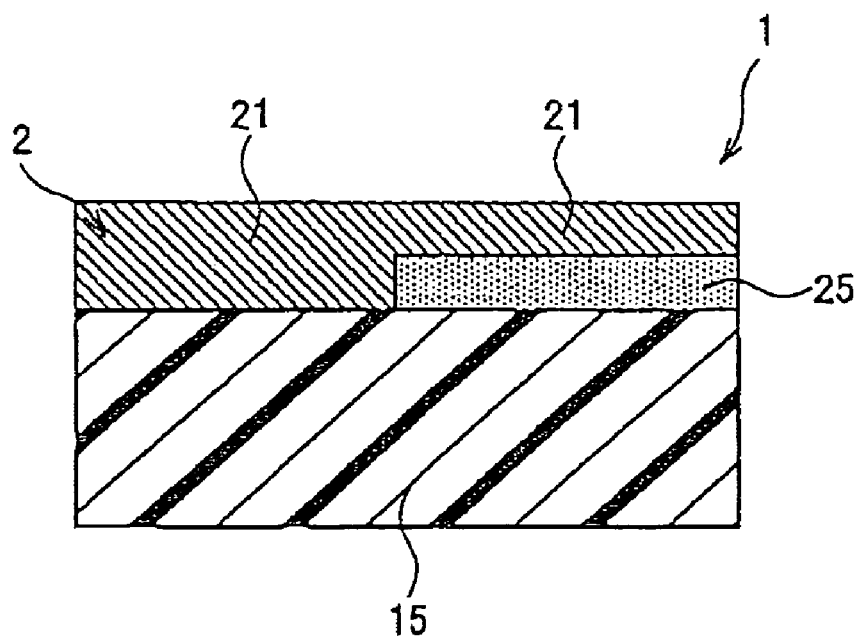
FIG. 9 is an explanatory diagram showing the cross-sectional structure of a display panel in which a printed layer is formed on a resin substrate, with a cured product having lower pencil hardness being disposed in a laminated state on a cured product having higher pencil hardness.

As shown in FIG. 5, the inkjet printing apparatus 7 of the present embodiment is provided with two ink tanks 71 and 72 respectively containing UV-curable inks 210 and 250 which obtain different pencil hardness values. The ink tank 71 contains a low concentration polyfunctional monomer ink (sample X2) as the UV-curable ink, while the ink tank 72 contains a high concentration polyfunctional monomer ink (sample X3) as the UV-curable ink. Each of the ink tanks 71 and 72 further contains inks of various colors (C (cyan), Y (yellow), K (black) and M (magenta)), and has printhead nozzles for discharging the inks of various colors.

The printing apparatus 7 is equipped with a light source 75 for irradiating ultraviolet rays (UV) 76 right beside the ink tanks 71 and 72. The printing apparatus 7 has a configuration which can inject ink droplets 210 and 250 from the printhead nozzles, and then irradiate the injected ink droplets 210 and 250 with ultraviolet rays 76.

Specifically, the display panel 1 was produced as follows.

First, an image as an instrument dial plate for vehicles (see FIG. 1) was drawn with a computer, and then this image data was inputted to an inkjet printing apparatus 7 (see FIG. 5). At this time, resolution of the cured products 21, 22, 23 and 25 of the various inks, ink droplet volume, color, halftone rate and the like can be specified.

Then, as shown in FIG. 5, a resin substrate 15 formed from polycarbonate or the like was provided, printing was performed by an inkjet method using UV-curable ink, using UV-curable inks 210 and 250 and the inkjet printing apparatus 7 to which the image data had been inputted, for the areas of the resin substrate 15 prearranged to have the transmissive parts 22 and 23 and opaque parts 21 and 25 formed thereon (see FIG. 3), and the UV-curable inks were cured by irradiating ultraviolet rays 76. In the present Example, printing was performed with the liquid droplet volume of the UV-curable ink set to 30 pl or less, and ultraviolet rays 76 were irradiated within one second from the jetting of liquid droplets, to cure the ink. This jetting of liquid droplets and irradiation of ultraviolet rays were repeated to form a printed layer 2 including the cured products 21, 22, 23 and 25 of the UV-curable inks, on the graphical design surface 151 side of the resin substrate 15 (see FIG. 3).

Furthermore, a printed layer 2 was also formed on the rear surface 152 side of the resin substrate 15 by means of the same UV-curable type inkjet apparatus.

In the present embodiment, as shown in FIG. 3, a cured product (opaque part) 25 formed from the UV-curable ink of the sample X3 was formed at the edge part of the display panel 1, and in the areas other than that, cured products 21, 22 and 23 formed from the UV-curable ink of the sample X2 were formed. The part where the cured product 25 was formed, is the pressed part 29 at which the display panel 1 is disposed in a casing 55, and is inserted into the casing 55 and pressed at the time of use as an instrument gauge for vehicles (see FIG. 4).

As discussed above, the display panel 1 having the cured products 21, 22, 23 and 25 formed on the graphical design surface 151 and the rear surface 152 of the resin substrate 15 as shown in FIG. 3, was produced. This was designated as the sample E1.

In the sample E1, as described above, the cured product 25 formed from the UV-curable ink of the sample X3 was formed at the edge part (pressed part 29) of the display panel, and in the areas other than that, the cured products 21, 22 and 23 formed from the UV-curable ink of the sample X2 were formed.

In the present embodiment, subsequently, a display panel 1 was produced in the same manner as in the case of the sample E1, except that a cured product 25 formed from the UV-curable ink of the sample X3 was formed at the edge part (pressed part 29) of the display panel 1, and in the areas other than that, cured produces 21, 22 and 23 formed from the UV-curable ink of the sample X1 were formed. This was designated as sample E2 (see FIG. 3).

As for the comparison with the sample E1 and the sample E2, display panels were produced in the same manner as in the case of the sample E1, except that a printed layer was formed on a resin substrate using each of the UV-curable inks of the samples X1 to X3 alone. These were designated as samples C1 to C3.

The sample C1 is a display panel in which the cured products 21, 22, 23 and 25 in the printed layer 2 are all formed from the sample X1 (see FIG. 3).

The sample C2 is a display panel in which the cured products 21, 22, 23 and 25 in the printed layer 2 are all formed from the sample X2 (see FIG. 3).

The sample C3 is a display panel in which the cured products 21, 22, 23 and 25 in the printed layer 2 are all formed from the sample X3 (see FIG. 3).

Subsequently, for each of the display panels (the sample E1, sample E2 and samples C1 to C3) 1, hot press processing was performed by air pressure molding or the like at a temperature of 150° C. to 180° C. By this hot press molding, the speedometer gauge part formed approximately at the central part of the display panel 1 was made to protrude toward the graphical design surface 151 side. In this display panel 1, through-holes 41, 42 and 43 for disposing the pointers for instrument gauges were formed. Furthermore, the display panel was punched to have a predetermined external shape. As such, the display panels 1 shown in FIG. 1 and FIG. 2 were produced.

During the hot press processing and punching processing, the presence or absence of the generation of cracks or peeling in the printed layer of each of the display panels (sample E1, sample E2 and sample C1 to sample C3) was visually inspected. The case where generation of cracks or peeling in the printed layer was not observed, was graded as "O", and the case where the generation was observed, was graded as "x". The results are presented in the following Table 2.

Subsequently, for the display panels of the sample E1, sample E2 and samples C1 to C3, the following test on pressing resistance was performed.

[Pressing Resistance]

Each of the display panels (sample E1, sample E2 and sample C1 to sample C3) 1 was held in a casing 55, together with a pointer 51, a light source (LED lighting) 52, a circuit board 53, a light diffuser plate 54 and the like, to manufacture an instrument, gauge for vehicles 5 (see FIG. 4). At this time, each of the display panels 1 is inserted into the casing at a pressure of 0.1 MPa, 0.5 MPa or 1.0 MPa against the pressed part 29. Subsequently, the display panel 1 inserted into the casing 55 was repeatedly subjected to a thermal cycle of cooling to a temperature of −30° C. for 1 hour, and then heating to a temperature of 90° C. for 1 hour, for 200 times. Then, the presence or absence of any abnormalities such as peeling or depression of the printed layer 2 at the pressed part 29 of the display panel 1, was verified. The verification was carried out by passing electricity through the light source 52 of the instrument gauge for vehicles, and determining the presence or absence of light leakage from the graphical design surface 151 of the display panel 1. The determination was carried out such that the case where light leakage was absent was graded as "O", and the case where light leakage was present was graded as "x". The results are presented in Table 2.

For the display panels 1 having a printed layer 2 formed from at least two cured products having different pencil hardness values (sample E1 and sample E2), for example, a cured product 25 having higher pencil hardness can be formed at the pressed part 29 where the display panel is pressed by contacting with another member (casing for the instrument gauge for vehicles), or for example, cured products 21, 22 and 23 having lower pencil hardness can be formed at the parts which are subjected to molding, processing or the like (see FIG. 3 and FIG. 4). Therefore, as can be seen from Table 2, the sample E1 and the sample E2 could be molded by means of a mold having a predetermined shape, or subjected to punching processing, cutting processing or the like, with hardly any cracks being generated in the printed layer 2. Generation of cracks or the like in the printed layer 2 due to the stress exerted on the pressed part 29 could also be prevented.

On the contrary to this, in the display panels produced using one type of UV-curable ink (samples C1 to C3), the pressing resistance at the pressed part was insufficient, or cracks or peeling occurred in the printed layer during molding and/or processing (see Table 2).

In the sample E1 and sample E2 of the present embodiment, the cured products having different pencil hardness values are respectively formed from a low concentration polyfunctional monomer ink containing the polyfunctional monomer in an amount of 5 parts by weight or less in 100 parts by weight of the UV-curable monomers, and a high concentration polyfunctional monomer ink containing the polyfunctional monomer in an amount of 10 parts by weight or more in 100 parts by weight of the UV-curable monomers. The cured products formed from the high concentration polyfunctional monomer ink are formed at the pressed part where the display panel is pressed by contacting with another member, while the cured products formed from the low concentration polyfunctional monomer ink are formed in areas other than the pressed part, including the molded parts and/or processed parts.

For that reason, the sample E1 and the sample E2 can be molded and processed without having cracks, peeling or the like generated at the molded parts and/or processed parts, and at the same time, the samples exhibited excellent durability against a stress as large as 1.0 MPa at the pressed part (see Table 2).

Furthermore, in the sample E1 and the sample E2 of the present embodiment, the cured product 25 formed using the UV-curable ink of sample X3 was formed to have the same color (black) as that of the cured product 21 formed on the periphery (see FIG. 3).

For that reason, in the printed layers 2 of the sample E1 and the sample E3, the boundaries between the two or more cured products 21 and 25 having different pencil hardness values, can be hardly distinguished by the external appearance, and the printed layer 2 can exhibit excellent graphical design properties without any uncomfortable sensation in view of graphical design.

TABLE 2

| Type of display panel | UV-curable ink of cured product at pressed part | UV-curable ink of cured product at areas other than pressed part | Pressing resistance (0.1 MPa) | Pressing resistance (0.5 MPa) | Pressing resistance (1.0 MPa) | Cracks or peeling at molded/processed part |
|---|---|---|---|---|---|---|
| Sample E1 | Sample X3 | Sample X2 | O | O | O | O |
| Sample E2 | Sample X3 | Sample X1 | O | O | O | O |
| Sample C1 | Sample X1 | Sample X1 | O | X | X | O |
| Sample C2 | Sample X2 | Sample X2 | O | O | X | O |
| Sample C3 | Sample X3 | Sample X3 | O | O | O | X |

As discussed above, according to the present embodiment, a display panel (sample E1 and sample E2) capable of coping with various designs and molding and/or processing, and a method for producing the display panel can be provided.

Embodiment 2

In the present embodiment, as shown in Table 3 to Table 8, a plurality of UV-curable inks having different compositions were first prepared, and an evaluation thereof as inks for the use in a display panel was performed.

First, UV-curable inks having a composition falling in the scope of the present invention (Examples 1 to 19), and UV-curable inks having compositions out of the scope of the present invention (Comparative Examples 1 to 8) were prepared. The composition of the UV-curable monomers in the UV-curable ink and the viscosity of the UV-curable ink are presented in Tables 3 to 8.

These inks (Examples 1 to 19 and Comparative Examples 1 to 8) contain a monofunctional monomer, a bifunctional monomer, a pigment, as well as a polymerization initiator and a dispersant. The types and contents of the components other than the UV-curable monomers and the pigment are respectively the same and almost equal for the various inks.

Subsequently, a resin substrate formed from polycarbonate, having a thickness of 0.5 mm, was provided. On this resin substrate, a printed layer was formed through inkjet printing, by performing printing with various UV-curable inks (Examples 1 to 19 and Comparative Examples 1 to 8), and curing the inks by UV irradiation.

Inkjet printing was conducted such that a Ca4 printhead manufactured by TOSHIBA TEC Corporation was filled with each of the UV-curable inks, and the UV-curable ink was heated to a temperature of 45° C. inside the printhead, to attain an ink viscosity at the time of discharge of about 10 mPa·s. The printed layer was formed by setting the liquid droplet volume to 6 pl or 12 pl, and setting the printhead scanning rate to about 20 m/min, by dropping the ink in an eight-pass mode at 600 dpi×1200 dpi. As for the ink curing, a UV exposure machine accessory to an inkjet apparatus was used, with the conditions adjusted to a peak wavelength of 365 nm and an illuminance of 1000 mW.

The illuminance was measured using the N-1 illuminance meter (for measurement at a wavelength of 365 nm) manufactured by GS Yuasa Corp.

In the present Embodiment, the printed layer formed on the resin substrate can be used as a substitute for the print output printed and formed by conventional silk screen process printing, and the printed layer is generally not made as a transmissive image at the inkjet print density used in paper printing, signboards and the like. Therefore, printing was performed such that the print densities of the respective colors would respectively be transmission densities such as 2.0 to 5.0 for black, 0.4 to 0.6 for cyan, 0.7 to 1.0 for magenta, and 0.1 to 0.2 for yellow. These measurements were made using a transmission densitometer manufactured by X-RIGHT, Inc.

The curability of the UV-curable ink is known to vary with the intensity of UV illuminance, irradiation energy (integrated amount of light), the amount of ink dropped by inkjet in one time, and the transmission density of the ink itself.

As the printing conditions during the production of display panel of the present Example, the following suitable conditions can be used.

That is, UV irradiation can be carried out at 600 mW to 1500 mW. This is because, if the UV illuminance exceeds 1500 mW, there is a risk of expansion of the resin substrate under heat, or deterioration of the resin substrate by UV, which may result in yellowing. On the other hand, an illuminance of less than 600 mW is insufficient because there is a risk that the UV intensity for transmitting to the interior may be insufficient, causing insufficient curing.

Furthermore, in general, the irradiation time is determined by the printhead operation speed at the main operating time, because the UV lamp disposed in parallel with the inkjet printhead repeats an operation of passing over the ink instantly after ink dropping.

The maximum operation speed is determined by the frequency of the printhead. In view of the productivity and curability, the integrated amount of light in one-pass of the main operation can be set to 100 to 300 mJ. The dropping amount of ink is set such that the maximum droplet volume is set to 12 pl, in order to suppress deterioration of the image quality of the print output. If the liquid droplet volume is greater than 20 pl, there is a risk that for example, when inkjet printing is conducted along a straight line, the end section of the line may bleed because of wet spreading upon the impact of the ink droplet on the resin substrate. To realize a line resolution of the silk screen process level, a liquid droplet volume of 12 pl or less is suitable.

As for the transmission density of the ink itself, the ink density of black color, which has the poorest UV transmissibility, serves as the reference point. If the ink density of black is set low, the curability would be remarkably improved, but it would be difficult to manifest a desired transmission density unless printing is performed repeatedly a number of times. On the other hand, if the pigment ratio is increased, curing may be significantly deteriorated. Therefore, the transmission density of a printed layer having a thickness of 10 μm is suitably 1.05 to 1.25.

That is, in the case of producing a display panel in which the backlight such as an LED lamp is disposed on the rear side, for example, as in the indicator of an automotive meter, it is necessary to form opaque parts where light is transmitted, and opaque parts where light is hardly transmitted. Realization of this opaqueness requires a transmission density of 4.0. Therefore, when printing is performed as described above with an ink having a transmission density of 1.0 to a thickness of 10 μm, it is necessary to form a printed layer having a thickness of 40 μm by repeating the printing process at least four or more times. Even if printing is repeated four times, there is a risk that it may be difficult to sufficiently form opaque parts, upon considering the unevenness of liquid droplets. Furthermore, when a printed layer having a thickness of 50 μm is formed by lamination printing five or more times, a sufficient density may be achieved as the opaque parts, but there is a risk that the thickness of the printed layer may be increased too much, resulting in shrinkage by curing of the printed layer or generation of large warpage in the printed layer. Furthermore, in this case, there is a risk that the difference between concavity and convexity in the opaque parts and transmissive parts may increase, and thus the visual quality of the external appearance may be deteriorated. In addition, when an overcoat layer for delustering the surface or for imparting hardcoat properties to the surface of the display panel is formed by silk screen process printing, it may become difficult for the ink to penetrate through the irregular parts.

Therefore, it is important that the black ink achieves a transmission density of 4.0 at a thickness of 40 μm or less, and in order to achieve this, it will be suitable that the transmission density of a printed layer having a thickness of 10 μm is 1.05 to 1.25.

Under the printing conditions as described above, printing was performed with each of the UV-curable inks (Examples 1 to 19 and Comparative Examples 1 to 8) on a resin substrate, and thus 27 types of display panels were obtained.

Subsequently, an evaluation was performed for each of the obtained display panels in terms of moldability, processability, and the durability of the printed layer. Specifically, the following evaluation tests were performed.

[Stretchability]

From each of the display panels, a dumbbell-shaped specimen as prescribed in JIS K6257 (width 5 mm, thickness of the printed layer 20 to 100 μm, and thickness of the substrate 0.5 mm) was punched. This dumbbell-shaped specimen was stretched by a tensile testing machine at a tensile speed of 50 mm/min. Then, the rate of elongation (draw ratio; %) of the distance between marked points at the time point where cracks generated in the printed layer, was measured. The measurement was performed under the conditions of a measurement temperature of 180° C., a distance between chucks of 40 mm, and an initial distance between marked points of 40 mm. The results are presented in Table 3 to Table 8.

[Adhesiveness]

The evaluation of adhesiveness was performed by means of the cross-cut peeling test as prescribed in JIS D2020. Specifically, first, the printed layer in each of the display panels was cut lengthwise and breadthwise to form cross-cuts about 1 mm on each side. Subsequently, cellophane tape was adhered to the printed layer inserted with the cross-cuts, and then the tape was peeled off. The case where the printed layer did not peel along with the tape, was graded as "O", while the case where peeling of the printed layer along with the tape was observed, was graded as "x". The results are presented in Table 3 to Table 8.

[Curability]

The printed layer of each of the printed substrates was pressed with the ball of a finger, and then it was visually inspected as to whether or not the fingerprint mark was left on the printed layer. The case where the fingerprint mark could not be confirmed by visual inspection, was graded as "O", while the case where the fingerprint mark could be confirmed, was graded as "x". The results are presented in Table 3 to Table 8

[Blocking (1)]

100 sheets each of the display panels of Examples 1 to 10 and Comparative Examples 1 to 3 were produced, and lamination was performed with 100 sheets for each type. The laminates were left to stand at room temperature for 24 hours. Then, the display panels were taken out one sheet by one sheet, from the display panel in the laminated state. At this time, it was checked whether or not the printed layer adhered to the resin substrate, and the ink from the printed layer was transferred to the resin substrate. The case where the ink was transferred to other resin substrates by adhesion, was graded as "x", and the case where the ink was not transferred, was graded as "O". The results are presented in Table 3 to Table 8

[Blocking (2)]

On the printed layer of each of the display panels, an acrylic plate having a size of 80 mm in length×80 mm in width×2.5 mm in thickness was disposed, and a 10-gram weight was disposed on the acrylic plate. Subsequently, the display panel with the acrylic plate and the weight disposed thereon was placed in a constant temperature bath at a temperature of 90° C., and was left to stand for 40 hours. Then, the display panel was cooled to normal temperature, and the acrylic plate was peeled off from the display panel. At this time, it was checked whether or not the ink was transferred to the acrylic plate side. The case where the ink from the printed layer was transferred to the acrylic plate, was graded as "x", and the case where the ink was not transferred, was graded as "O". The results are presented in Table 3 to Table 8.

[Cracking Upon Cutting External Form]

Each of the display panels was cut to a predetermined external shape using a Thompson blade and a punch. The end face of the cut part was observed under a microscope, to check the presence or absence of cracks in the printed layer. The case where cracks were observed in the printed layer, was graded as "x", and the case where cracks were not observed, was graded as "O". The results are presented in Table 3 to Table 8.

[Pencil Hardness Test]

Each of the display panels was disposed on a hot plate set at a temperature of 90° C., and the printed layer was heated to about 90° C. Subsequently, the pencil hardness test as prescribed in JIS 5100 was performed, to measure the pencil hardness of the printed layer. A pencil hardness of 2B or higher was graded as "O", a pencil hardness of 4B or higher and lower than 2B was graded as "Δ", and a pencil hardness of 5B or lower was graded as "x". The results are presented in Table 3 to Table 8

TABLE 3

| | | UV-curable ink | | | | | | | |
|---|---|---|---|---|---|---|---|---|---|
| | | Composition (parts by weight) | | | | | | | |
| | | Monofunctional monomer | | | Bifunctional monomer Bisphenol A diacrylate | Initiator | | | |
| Example No. | Type of printhead | Phenoxyethyl acrylate | N-acryloyloxy ethyl hexahydrophthalimide | Vinylcaprolactam | | (1) | (2) | Pigment | Viscosity (mPa/s) |
| Comparative Example 1 | C | 100 | — | — | 3 | 0 | 25 | 2 | 20-25 |
| | Y | | | | | 0 | 25 | 5 | 20-25 |
| | K | | | | | 0 | 25 | 3 | 20-25 |
| | M | | | | | 0 | 25 | 7 | 25-30 |
| Example 1 | C | 72.2 | 5.6 | 22.2 | 10 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 2 | C | 74.2 | 5.2 | 20.6 | 3 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 3 | C | 66.6 | 5.6 | 27.8 | 10 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 4 | C | 69 | 5.2 | 25.8 | 3 | 5 | 5 | 2 | 20-25 |
| | Y | | | | | 5 | 5 | 5 | 20-25 |
| | K | | | | | 5 | 5 | 3 | 20-25 |

TABLE 3-continued

| Example No. | Type of printhead | | | | | | M | 5 | 5 | 7 | 25-30 |

Printed layer

| Example No. | Type of printhead | Stretchability (%) | Adhesiveness | Curability | Blocking (1) | Blocking (2) | Cracking upon cutting external form | Pencil hardness test |
|---|---|---|---|---|---|---|---|---|
| Comparative Example 1 | C | 150 | ○ | X | X | X | X | X |
|  | Y | 150 | ○ | X | X | X | X | X |
|  | K | 150 | ○ | X | X | X | X | X |
|  | M | 150 | ○ | X | X | X | X | X |
| Example 1 | C | 60 | ○ | ○ | ○ | ○ | ○ | ○ |
|  | Y | 60 | ○ | ○ | ○ | ○ | ○ | ○ |
|  | K | 60 | ○ | ○ | ○ | ○ | ○ | ○ |
|  | M | 60 | ○ | ○ | ○ | ○ | ○ | ○ |
| Example 2 | C | 150 | ○ | ○ | ○ | ○ | ○ | Δ |
|  | Y | 150 | ○ | ○ | ○ | ○ | ○ | Δ |
|  | K | 150 | ○ | ○ | ○ | ○ | ○ | Δ |
|  | M | 150 | ○ | ○ | ○ | ○ | ○ | Δ |
| Example 3 | C | 60 | ○ | ○ | ○ | ○ | ○ | ○ |
|  | Y | 60 | ○ | ○ | ○ | ○ | ○ | ○ |
|  | K | 60 | ○ | ○ | ○ | ○ | ○ | ○ |
|  | M | 60 | ○ | ○ | ○ | ○ | ○ | ○ |
| Example 4 | C | 150 | ○ | ○ | ○ | ○ | ○ | Δ |
|  | Y | 150 | ○ | ○ | ○ | ○ | ○ | Δ |
|  | K | 150 | ○ | ○ | ○ | ○ | ○ | Δ |
|  | M | 150 | ○ | ○ | ○ | ○ | ○ | Δ |

Initiator (1) oligo(2-hydroxy-2-methyl-1-(4-methylvinyl)phenylpropane
(2) 2,4,6-trimethylbenzoyldiphenylphosphine oxide

TABLE 4

UV-curable ink

Composition (parts by weight)

| Example No. | Type of printhead | Monofunctional monomer | | | Bifunctional monomer Bisphenol A diacrylate | Initiator | | Pigment | Viscosity (mPa/s) |
|---|---|---|---|---|---|---|---|---|---|
| | | Phenoxyethyl acrylate | N-acryloyloxy ethyl hexahydrophthalimide | Vinylcaprolactam | | (1) | (2) | | |
| Example 5 | C | 77.7 | 5.6 | 16.7 | 10 | 5 | 5 | 2 | 20-25 |
|  | Y | | | | | 5 | 5 | 5 | 20-25 |
|  | K | | | | | 5 | 5 | 3 | 20-25 |
|  | M | | | | | 5 | 5 | 7 | 25-30 |
| Example 6 | C | 79.3 | 5.2 | 15.5 | 3 | 5 | 5 | 2 | 20-25 |
|  | Y | | | | | 5 | 5 | 5 | 20-25 |
|  | K | | | | | 5 | 5 | 3 | 20-25 |
|  | M | | | | | 5 | 5 | 7 | 25-30 |
| Comparative Example 2 | C | 94.4 | 5.6 | — | 10 | 0 | 25 | 2 | 20-25 |
|  | Y | | | | | 0 | 25 | 5 | 20-25 |
|  | K | | | | | 0 | 25 | 3 | 20-25 |
|  | M | | | | | 0 | 25 | 7 | 25-30 |
| Comparative Example 3 | C | 84.5 | — | 15.5 | 3 | 0 | 25 | 2 | 20-25 |
|  | Y | | | | | 0 | 25 | 5 | 20-25 |
|  | K | | | | | 0 | 25 | 3 | 20-25 |
|  | M | | | | | 0 | 25 | 7 | 25-30 |
| Comparative Example 4 | C | 100 | — | — | 10 | 0 | 25 | 2 | 20-25 |
|  | Y | | | | | 0 | 25 | 5 | 20-25 |
|  | K | | | | | 0 | 25 | 3 | 20-25 |
|  | M | | | | | 0 | 25 | 7 | 25-30 |

Printed layer

| Example No. | Type of printhead | Stretchability (%) | Adhesiveness | Curability | Blocking (1) | Blocking (2) | Cracking upon cutting external form | Pencil hardness test |
|---|---|---|---|---|---|---|---|---|
| Example 5 | C | 60 | ○ | ○ | ○ | ○ | ○ | ○ |
|  | Y | 60 | ○ | ○ | ○ | ○ | ○ | ○ |
|  | K | 60 | ○ | ○ | ○ | ○ | ○ | ○ |
|  | M | 60 | ○ | ○ | ○ | ○ | ○ | ○ |

TABLE 4-continued

|  |  |  |  |  |  |  |  |  |
|---|---|---|---|---|---|---|---|---|
| Example 6 | C | 150 | ○ | ○ | ○ | ○ | ○ | Δ |
|  | Y | 150 | ○ | ○ | ○ | ○ | ○ | Δ |
|  | K | 150 | ○ | ○ | ○ | ○ | ○ | Δ |
|  | M | 150 | ○ | ○ | ○ | ○ | ○ | Δ |
| Comparative | C | 60 | ○ | X | ○ | ○ | ○ | ○ |
| Example 2 | Y | 60 | ○ | X | ○ | ○ | ○ | ○ |
|  | K | 60 | ○ | X | ○ | ○ | ○ | ○ |
|  | M | 60 | ○ | X | ○ | ○ | ○ | ○ |
| Comparative | C | 150 | ○ | X | X | X | ○ | Δ |
| Example 3 | Y | 150 | ○ | X | X | X | ○ | Δ |
|  | K | 150 | ○ | X | X | X | ○ | Δ |
|  | M | 150 | ○ | X | X | X | ○ | Δ |
| Comparative | C | 60 | ○ | X | X | X | ○ | ○ |
| Example 4 | Y | 60 | ○ | X | X | X | ○ | ○ |
|  | K | 60 | ○ | X | X | X | ○ | ○ |
|  | M | 60 | ○ | X | X | X | ○ | ○ |

Initiator (1) oligo(2-hydroxy-2-methyl-1-(4-methylvinyl)phenylpropane
(2) 2,4,6-trimethylbenzoyldiphenylphosphine oxide

TABLE 5

| | | UV-curable ink | | | | | | | |
|---|---|---|---|---|---|---|---|---|---|
| | | Composition (parts by weight) | | | | | | | |
| | | Monofunctional monomer | | | Bifunctional monomer Bisphenol A diacrylate | Initiator | | | Viscosity |
| Example No. | Type of printhead | Phenoxyethyl acrylate | N-acryloyloxy ethyl hexahydrophthalimide | Vinylcaprolactam | | (1) | (2) | Pigment | (mPa/s) |
| Comparative | C | 100 | — | — | 3 | 0 | 25 | 2 | 20-25 |
| Example 5 | Y | | | | | 0 | 25 | 5 | 20-25 |
| | K | | | | | 0 | 25 | 3 | 20-25 |
| | M | | | | | 0 | 25 | 7 | 25-30 |
| Example 7 | C | 84.5 | 5.2 | 10.3 | 3 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 8 | C | 79.3 | 5.2 | 15.5 | 3 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 9 | C | 74.2 | 5.2 | 20.6 | 3 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 10 | C | 69 | 5.2 | 25.8 | 3 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |

| | | | | | Printed layer | | | |
|---|---|---|---|---|---|---|---|---|
| Example No. | Type of printhead | Stretchability (%) | Adhesiveness | Curability | Blocking (1) | Blocking (2) | Cracking upon cutting external form | Pencil hardness test |
| Comparative | C | 60 | X | X | X | X | X | X |
| Example 5 | Y | 60 | X | X | X | X | X | X |
| | K | 60 | X | X | X | X | X | X |
| | M | 60 | X | X | X | X | X | X |
| Example 7 | C | 150 | ○ | ○ | ○ | ○ | ○ | Δ |
| | Y | 150 | ○ | ○ | ○ | ○ | ○ | Δ |
| | K | 150 | ○ | ○ | ○ | ○ | ○ | Δ |
| | M | 150 | ○ | ○ | ○ | ○ | ○ | Δ |
| Example 8 | C | 150 | ○ | ○ | ○ | ○ | ○ | Δ |
| | Y | 150 | ○ | ○ | ○ | ○ | ○ | Δ |
| | K | 150 | ○ | ○ | ○ | ○ | ○ | Δ |
| | M | 150 | ○ | ○ | ○ | ○ | ○ | Δ |
| Example 9 | C | 150 | ○ | ○ | ○ | ○ | ○ | ○ |
| | Y | 150 | ○ | ○ | ○ | ○ | ○ | ○ |
| | K | 150 | ○ | ○ | ○ | ○ | ○ | ○ |
| | M | 150 | ○ | ○ | ○ | ○ | ○ | ○ |

TABLE 5-continued

| | | | | | | | | |
|---|---|---|---|---|---|---|---|---|
| Example 10 | C | 150 | ○ | ○ | ○ | ○ | ○ | Δ |
| | Y | 150 | ○ | ○ | ○ | ○ | ○ | Δ |
| | K | 150 | ○ | ○ | ○ | ○ | ○ | Δ |
| | M | 150 | ○ | ○ | ○ | ○ | ○ | Δ |

Initiator (1) oligo(2-hydroxy-2-methyl-1-(4-methylvinyl)phenylpropanone
(2) 2,4,6-trimethylbenzoyldiphenylphosphine oxide

TABLE 6

| | | UV-curable ink | | | | | | | |
|---|---|---|---|---|---|---|---|---|---|
| | | Composition (parts by weight) | | | | | | | |
| | | Monofunctional monomer | | | Bifunctional | | | | |
| Example No. | Type of printhead | Phenoxyethyl acrylate | N-acryloyloxy ethyl hexahydrophthalimide | Vinylcaprolactam | monomer Bisphenol A diacrylate | Initiator (1) | (2) | Pigment | Viscosity (mPa/s) |
| Comparative Example 6 | C | 100 | — | — | 15 | 0 | 25 | 2 | 20-25 |
| | Y | | | | | 0 | 25 | 5 | 20-25 |
| | K | | | | | 0 | 25 | 3 | 20-25 |
| | M | | | | | 0 | 25 | 7 | 25-30 |
| Example 11 | C | 82.3 | 5.9 | 11.8 | 15 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 12 | C | 76.5 | 5.9 | 17.6 | 15 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 13 | C | 70.6 | 5.9 | 23.5 | 15 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 14 | C | 61.7 | 5.9 | 29.4 | 15 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |

| Example No. | Type of printhead | Stretchability (%) | Adhesiveness | Curability | Blocking (1) | Blocking (2) | Cracking upon cutting external form | Pencil hardness test |
|---|---|---|---|---|---|---|---|---|
| Comparative Example 6 | C | 30 | X | X | ○ | ○ | X | X |
| | Y | 30 | X | X | ○ | ○ | X | X |
| | K | 30 | X | X | ○ | ○ | X | X |
| | M | 30 | X | X | ○ | ○ | X | X |
| Example 11 | C | 30 | ○ | ○ | ○ | ○ | ○ | ○ |
| | Y | 30 | ○ | ○ | ○ | ○ | ○ | ○ |
| | K | 30 | ○ | ○ | ○ | ○ | ○ | ○ |
| | M | 30 | ○ | ○ | ○ | ○ | ○ | ○ |
| Example 12 | C | 30 | ○ | ○ | ○ | ○ | ○ | ○ |
| | Y | 30 | ○ | ○ | ○ | ○ | ○ | ○ |
| | K | 30 | ○ | ○ | ○ | ○ | ○ | ○ |
| | M | 30 | ○ | ○ | ○ | ○ | ○ | ○ |
| Example 13 | C | 30 | ○ | ○ | ○ | ○ | ○ | ○ |
| | Y | 30 | ○ | ○ | ○ | ○ | ○ | ○ |
| | K | 30 | ○ | ○ | ○ | ○ | ○ | ○ |
| | M | 30 | ○ | ○ | ○ | ○ | ○ | ○ |
| Example 14 | C | 30 | ○ | ○ | ○ | ○ | ○ | ○ |
| | Y | 30 | ○ | ○ | ○ | ○ | ○ | ○ |
| | K | 30 | ○ | ○ | ○ | ○ | ○ | ○ |
| | M | 30 | ○ | ○ | ○ | ○ | ○ | ○ |

Initiator (1) oligo(2-hydroxy-2-methyl-1-(4-methylvinyl)phenylpropanone
(2) 2,4,6-trimethylbenzoyldiphenylphosphine oxide

TABLE 7

UV-curable ink

Composition (parts by weight)

| Example No. | Type of printhead | Monofunctional monomer | | | Bifunctional monomer Bisphenol A diacrylate | Initiator | | Pigment | Viscosity (mPa·s) |
| --- | --- | --- | --- | --- | --- | --- | --- | --- | --- |
| | | Phenoxyethyl acrylate | N-acryloyloxy ethyl hexahydrophthalimide | Vinylcaprolactam | | (1) | (2) | | |
| Comparative Example 7 | C | 100 | — | — | 10 | 0 | 25 | 2 | 20-25 |
| | Y | | | | | 0 | 25 | 5 | 20-25 |
| | K | | | | | 0 | 25 | 3 | 20-25 |
| | M | | | | | 0 | 25 | 7 | 25-30 |
| Example 15 | C | 83.3 | 5.6 | 11.1 | 10 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 16 | C | 77.7 | 5.6 | 16.7 | 10 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 17 | C | 72.2 | 5.6 | 22.2 | 10 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |
| Example 18 | C | 66.6 | 5.6 | 27.8 | 10 | 5 | 5 | 2 | 20-25 |
| | Y | | | | | 5 | 5 | 5 | 20-25 |
| | K | | | | | 5 | 5 | 3 | 20-25 |
| | M | | | | | 5 | 5 | 7 | 25-30 |

Printed layer

| Example No. | Type of printhead | Stretchability (%) | Adhesiveness | Curability | Blocking (1) | Blocking (2) | Cracking upon cutting external form | Pencil hardness test |
| --- | --- | --- | --- | --- | --- | --- | --- | --- |
| Comparative Example 7 | C | 60 | ○ | X | X | X | X | X |
| | Y | 60 | ○ | X | X | X | X | X |
| | K | 60 | ○ | X | X | X | X | X |
| | M | 60 | ○ | X | X | X | X | X |
| Example 15 | C | 60 | ○ | ○ | ○ | ○ | ○ | ○ |
| | Y | 60 | ○ | ○ | ○ | ○ | ○ | ○ |
| | K | 60 | ○ | ○ | ○ | ○ | ○ | ○ |
| | M | 60 | ○ | ○ | ○ | ○ | ○ | ○ |
| Example 16 | C | 60 | ○ | ○ | ○ | ○ | ○ | ○ |
| | Y | 60 | ○ | ○ | ○ | ○ | ○ | ○ |
| | K | 60 | ○ | ○ | ○ | ○ | ○ | ○ |
| | M | 60 | ○ | ○ | ○ | ○ | ○ | ○ |
| Example 17 | C | 60 | ○ | ○ | ○ | ○ | ○ | ○ |
| | Y | 60 | ○ | ○ | ○ | ○ | ○ | ○ |
| | K | 60 | ○ | ○ | ○ | ○ | ○ | ○ |
| | M | 60 | ○ | ○ | ○ | ○ | ○ | ○ |
| Example 18 | C | 60 | ○ | ○ | ○ | ○ | ○ | ○ |
| | Y | 60 | ○ | ○ | ○ | ○ | ○ | ○ |
| | K | 60 | ○ | ○ | ○ | ○ | ○ | ○ |
| | M | 60 | ○ | ○ | ○ | ○ | ○ | ○ |

Initiator (1) oligo(2-hydroxy-2-methyl-1-(4-methylvinyl)phenylpropanone
(2) 2,4,6-trimethylbenzoyldiphenylphosphine oxide

TABLE 8

UV-curable ink

Composition (parts by weight)

| Example No. | Type of printhead | Monofunctional monomer | | | Bifunctional monomer Bisphenol A diacrylate | Initiator | | Pigment | Viscosity (mPa·s) |
| --- | --- | --- | --- | --- | --- | --- | --- | --- | --- |
| | | Phenoxyethyl acrylate | N-acryloyloxy ethyl hexahydrophthalimide | Vinylcaprolactam | | (1) | (2) | | |
| Comparative Example 8 | C | 89.7 | 10.3 | 0 | 3 | 0 | 25 | 2 | 20-25 |
| | Y | | | | | 0 | 25 | 5 | 20-25 |
| | K | | | | | 0 | 25 | 3 | 20-25 |
| | M | | | | | 0 | 25 | 7 | 25-30 |

TABLE 8-continued

| Example 19 | C | 84.5 | 10.3 | 5.2 | 3 | 5 | 5 | 2 | 20-25 |
|---|---|---|---|---|---|---|---|---|---|
| | Y | | | | | 5 | 5 | 5 | 20-25 |
| | K | | | | | 5 | 5 | 3 | 20-25 |
| | M | | | | | 5 | 5 | 7 | 25-30 |

| | | | Printed layer | | | | | |
|---|---|---|---|---|---|---|---|---|
| Example No. | Type of printhead | Stretchability (%) | Adhesiveness | Curability | Blocking (1) | Blocking (2) | Cracking upon cutting external form | Pencil hardness test |
| Comparative Example 8 | C | 150 | ○ | X | X | X | ○ | X |
| | Y | 150 | ○ | X | X | X | ○ | X |
| | K | 150 | ○ | X | X | X | ○ | X |
| | M | 150 | ○ | X | X | X | ○ | X |
| Example 19 | C | 150 | ○ | ○ | ○ | ○ | ○ | Δ |
| | Y | 150 | ○ | ○ | ○ | ○ | ○ | Δ |
| | K | 150 | ○ | ○ | ○ | ○ | ○ | Δ |
| | M | 150 | ○ | ○ | ○ | ○ | ○ | Δ |

Initiator (1) oligo(2-hydroxy-2-methyl-1-(4-methylvinyl)phenylpropanone
(2) 2,4,6-trimethylbenzoyldiphenylphosphine oxide As can be seen from Table 3 to Table 8, the display panels produced using a UV-curable ink containing at least vinylcaprolactam and N-acryloyloxyethyl hexahydrophthalimide as the monofunctional monomer (Examples 1 to 19) all exhibited a sufficiently excellent stretchability of 30% or higher during the processing of the display panels, and even at the time of cutting the external form, generation of cracks was not observed, and the display panels had excellent processability.

Furthermore, in the display panels of Examples 1 to 19, the printed layer had excellent adhesiveness and curability, so that transfer of the ink did not occur during the blocking test, and also exhibited excellent pencil hardness. Therefore, it can be seen that in the display panels of Examples 1 to 19, printed layers having excellent durability were formed.

On the contrary to this, in the display panels produced using the an ink which did not contain at least one of vinylcaprolactam and N-acryloyloxyethyl hexahydrophthalimide (Comparative Examples 1 to 8), a decrease in the UV-curability of the ink resulted in the occurrence of tack (tackiness).

Furthermore, although not clearly shown in the tables, in the ink containing more than 25% by weight of a monofunctional monomer other than PEA, the viscosity, surface tension and the like were likely to change, and the storage stability was slightly decreased after the production. Therefore, it is preferable that the monofunctional monomer other than PEA is contained in an amount of 25% by weight or less in the total amount of the monofunctional monomer.

As discussed in the above, it can be seen that when the UV-curable ink having a composition falling in the scope provided in the present invention is used, a display panel having excellent moldability and processability, as well as excellent durability of the printed layer, can be produced.

Embodiment 3

The present embodiment is an example for producing an instrument dial plate for vehicles, as the display panel.

Figure 10:
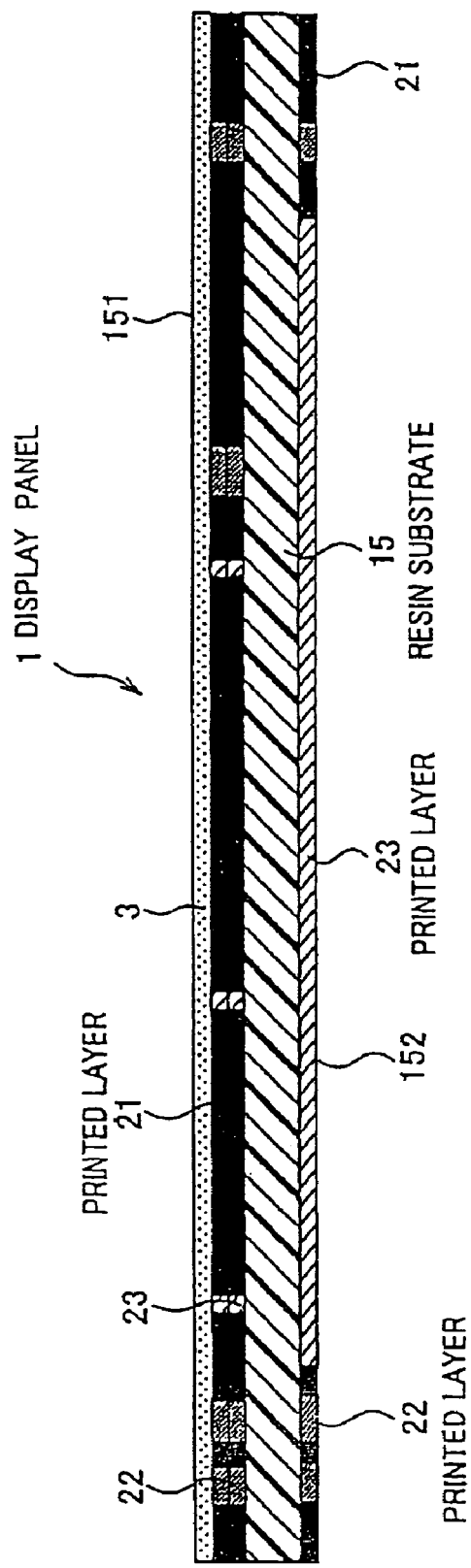
FIG. 10 is an explanatory cross-sectional view of a resin substrate according to Exemplary Embodiment 2, having a printed layer and an overcoat layer formed thereon.

As shown in FIGS. 1, 2 and 10, the display panel 1 of the present Example has a resin substrate 15, and printed layers 21, 22 and 23 formed thereon by performing inkjet printing using a UV-curable ink, and curing the UV-curable ink.

As shown in FIG. 1 and FIG. 2, the display panel 1 of the present Example is an instrument dial plate for vehicles. FIG. 1 is a front view of the display panel 1 of the present Example.

FIG. 2 is a cross-sectional view of the display panel 1 shown in FIG. 1. The display panel 1 has been subjected to molding processing, and thus has a structure in which the central part is more protruded than the periphery. FIG. 10 shows a cross-sectional view of the display panel 1 before it has been subjected to molding processing.

The display panel 1 has a light transmissive resin substrate 15, and printed layers 21, 22 and 23 formed by lamination on the graphical design surface 151 of the resin substrate. The printed layers 21, 22 and 23 are formed from UV-curable inks of various colors, such as clear (transparent), black, white, magenta, cyan, yellow, light cyan and light magenta, or mixtures thereof. In the present Embodiment, the printed layers 21, 22 and 23 are formed on both the graphical design surface 151 side and the rear surface 152 side of the resin substrate. In the graphical design surface 151, the printed layers 21, 22 and 23 are formed in lamination.

In the display panel 1, transmissive parts 22 and 23 which transmit visible light when light is illuminated from the rear surface 152 on the opposite side of the graphical design surface 151, and an opaque part 21 which does not transmit visible light, are formed. The transmissive parts 22 and 23 can be colored with a desired color, by appropriately mixing UV-curable type colored inks of various colors such as clear (transparent), black, white, magenta, cyan, yellow, light cyan and light magenta. In the present embodiment, the transmissive parts 22 and 23 show a fuel level gauge, a direction indicator, a speedometer gauge, a gear indicator and the like. Furthermore, by means of the light from the light source disposed on the rear surface 152 side of the display panel 1 or the like, the transmissive parts 22 and 23 can be brightly displayed even in dark.

In the display panel 1, a transparent overcoat layer 3 is formed so as to cover the printed layers 21, 22 and 23 on the graphical design surface 151 side. The display panel 1 of the present Embodiment exhibits a convex-shaped structure with the approximately central part being protruded toward the graphical design surface 151 side.

Hereinafter, the method for producing the display panel of the present embodiment will be described.

The display panel 1 was produced by drawing the graphical design image as shown in FIG. 1 using a computer, printing on the basis of this graphical design image, the image on the resin substrate by an inkjet method using UV-curable inks of full colors, curing the inks, and then performing molding.

In the present embodiment, the following is used as the production apparatus for the display panel. That is, for the drawing of images, for example, the image processing software manufactured by Adobe, Inc. is used. As the printing apparatus, a UV-curable type inkjet apparatus (inkjet printhead, UV-irradiating light source simultaneous driving type UJF605C manufactured by Mimaki Engineering Co., Ltd., maximum resolution 1200 DPI) is used. As the UV-curable ink, the ink of Example 1 in Table 3 of the embodiment 2 was used.

The printing machine is equipped with a light source which performs ultraviolet irradiation, right beside the inkjet printhead, and thus is configured such that ink droplets are injected from the nozzles of the printhead, and then the injected ink droplets are irradiated with ultraviolet rays.

Specifically, a display panel 1 was produced as follows.

First, an image was drawn with a computer, and then this image data was inputted into a printing machine. At this time, resolution of the various ink layers 21, 22 and 23, ink droplet volume, color, halftone rate and the like can be specified.

Then, a resin substrate 15 formed from polycarbonate or the like was provided, printing was performed by an inkjet method using UV-curable ink, using UV-curable inks and the inkjet printing apparatus to which the image date had been inputted, for the areas of the resin substrate 15 prearranged to have the transmissive parts 22 and 23 and the opaque part 21 formed thereon, and the UV-curable inks were cured by irradiating ultraviolet rays. In the present embodiment, printing was performed with a liquid droplet volume of the UV-curable ink of 30 pl or less, and ultraviolet rays 76 were irradiated within one second from the jetting of liquid droplets, to cure the ink. This jetting of liquid droplets and irradiation of ultraviolet rays were repeated to form printed layers 21, 22 and 23 by lamination, on the graphical design surface 151 side of the resin substrate 15.

Furthermore, printed layers 21, 22 and 23 were also formed on the rear surface 152 side of the resin substrate 15 using the same UV-curable type inkjet apparatus.

Subsequently, a transparent overcoat layer 3 was printed on the printed layers 21, 22 and 23 of the graphical design surface 151 side. The overcoat layer 3 was formed by performing silk screen process printing on the printed layers 21, 22 and 23.

Thus, as shown in FIG. 10, a display panel having the printed layers 21, 22 and 23 formed on the graphical design surface 151 and the rear surface 152 of the resin substrate 15, and an overcoat layer 3 is formed by lamination on the outermost layer of the graphical design surface 151 side.

Subsequently, the display panel 1 was subjected to hot press processing, by air pressure molding or the like at a temperature of 150° C. to 180° C. By this hot press molding, the speedometer gauge part formed approximately at the central part of the display panel 1 was made to protrude toward the graphical design surface 151 side. In the display panel 1, through-holes 41, 42 and 43 for disposing the pointers for instrument gauges were formed. Furthermore, the display panel was punched to have a predetermined external shape. As such, the display panel 1 shown in FIG. 1 and FIG. 2 was produced.

Figure 11:
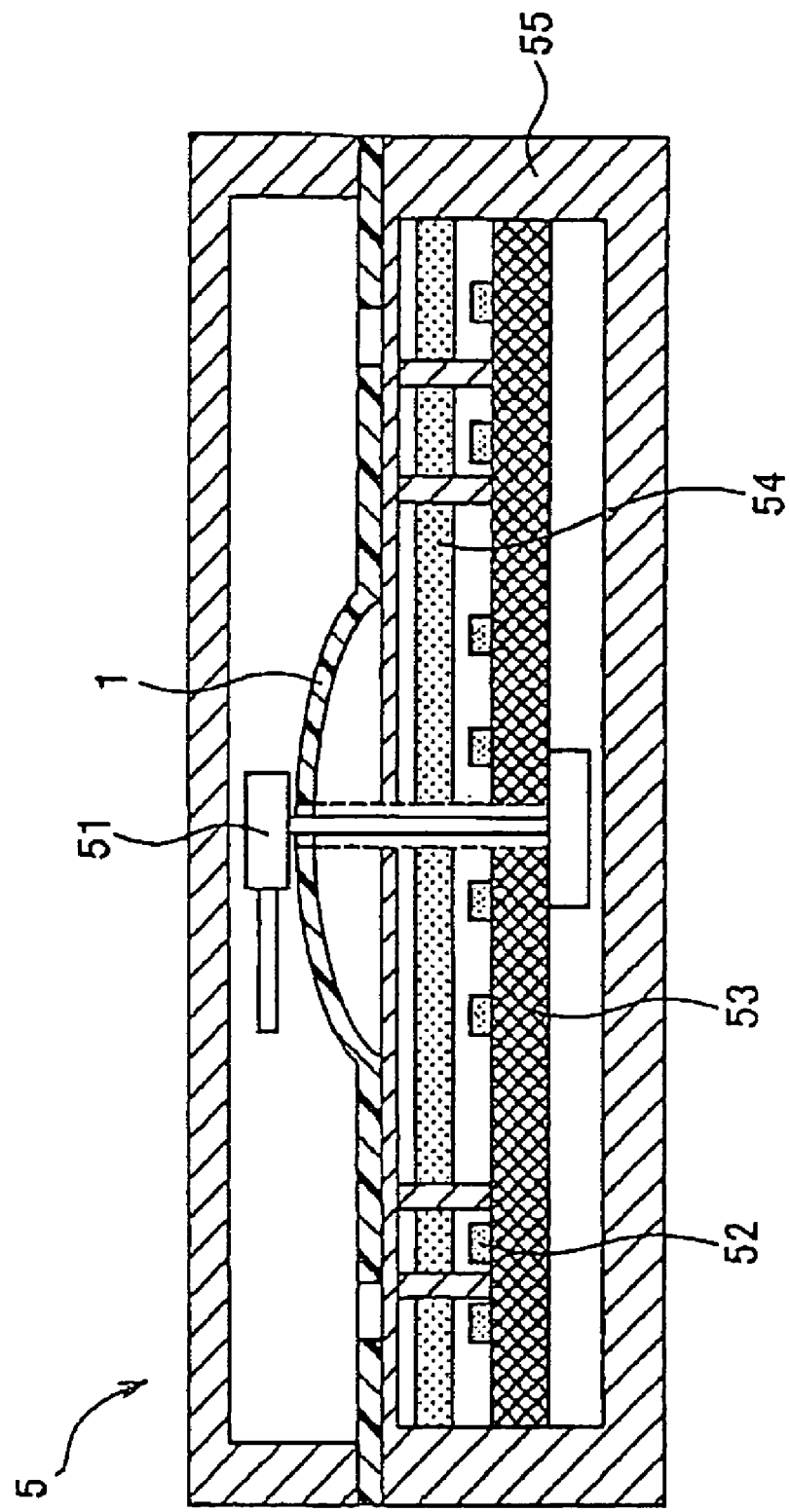
FIG. 11 is an explanatory cross-sectional view of an instrument gauge for vehicles, showing the configuration in which a display panel according to Exemplary Embodiment 2 is disposed inside an instrument casing for vehicles.

Now, this display panel 1 is held in a casing 55, together with a pointer 51, a light source (LED lighting) 52, a circuit board 53, a light diffuser plate 54 and the like, and thus an instrument gauge 5 for vehicles is completed (see FIG. 11).

In the present embodiment, an indicator panel 1 was produced, as described above, by forming a printed layer through inkjet printing using the UV-curable ink of Example 1 in the Table 3. Thus, a display panel having excellent moldability and processability, as well as excellent durability of the printed layer could be produced, by making the best use of the excellent features of the UV-curable ink (see Table 3).

In the present embodiment, as shown in FIG. 10, at the time of forming the printed layers 21, 22 and 23 on the resin substrate 15, the printed layers 21, 22 and 23 were formed by bilayer lamination on the graphical design surface 151 side, and the printed layers 21, 22 and 23 were formed as a single layer on the rear surface 152 side. However, there are also other patterns for forming the printed layers. Examples of the pattern for forming the printed layers are shown in FIGS. 12A to 12C.

Figure 12A:
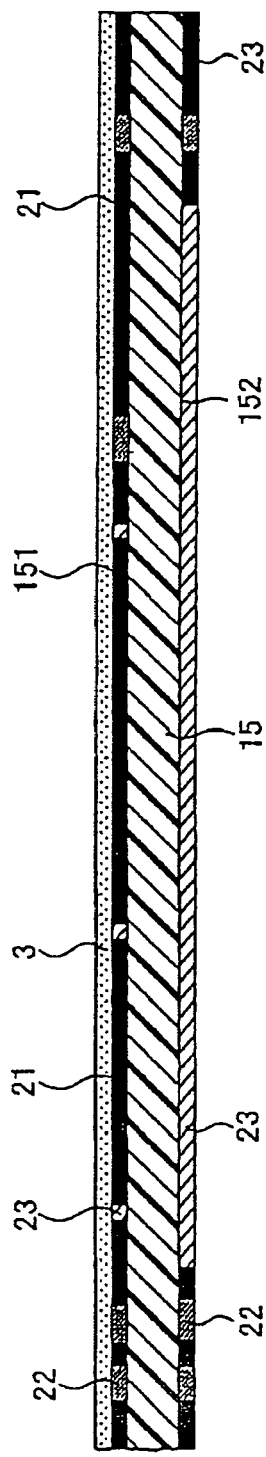
FIG. 12A is an explanatory cross-sectional view of a resin substrate according to Exemplary Embodiment 2, having a single printed layer formed on each of the graphical design surface side and the rear surface side.

That is, as shown in FIG. 12A, the printed layers 21, 22 and 23 can be formed as a single layer each on the graphical design surface 151 side and the rear surface 152 side of the resin substrate 15.

Figure 12B:
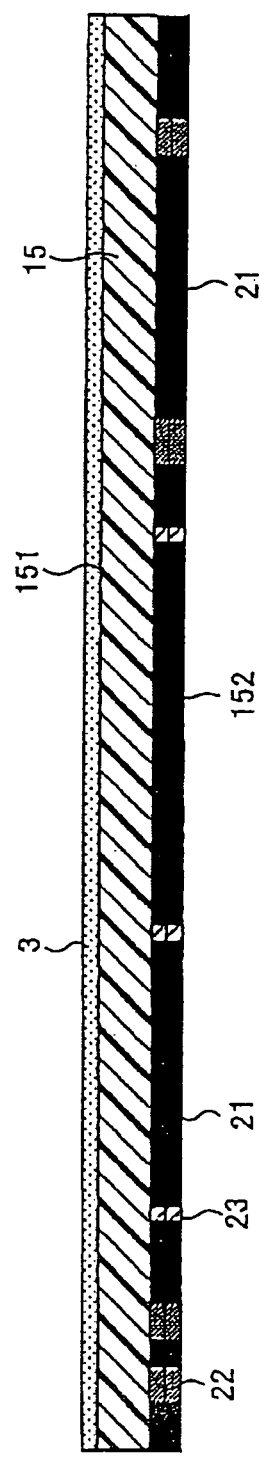
FIG. 12B is an explanatory cross-sectional view of a resin substrate according to Exemplary Embodiment 2, having two printed layers formed by lamination on the rear surface side.

Furthermore, as shown in FIG. 12B, the printed layers 21, 22 and 23 can be formed only on the rear surface 152 side of the resin substrate 15, with these printed layers 21, 22 and 23 being formed in the form of superimposed bilayer.

Figure 12C:
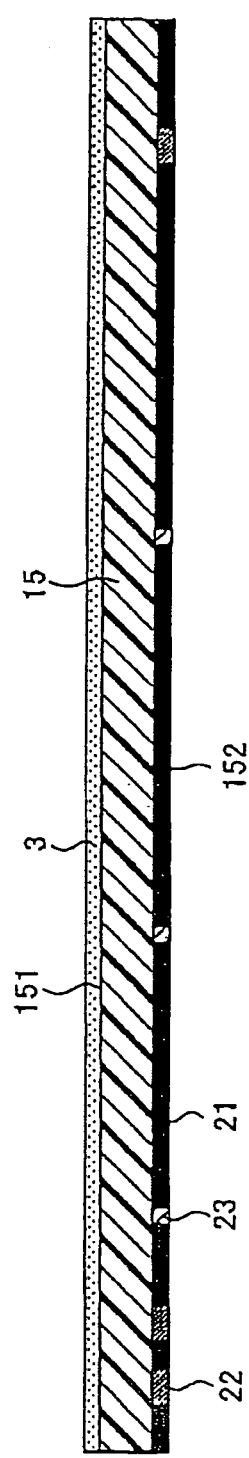
FIG. 12C is an explanatory cross-sectional view of a resin substrate according to Exemplary Embodiment 2, having a single printed layer formed on the rear surface side.

Also, as shown in FIG. 12C, the printed layers 21, 22 and 23 can be formed only on the rear surface 152 side of the resin substrate 15 as a single layer.

In all of these cases, an overcoat layer 3 is formed on the outermost layer on the graphical design surface 151 side viewed by users.

With any of the patterned printed layers, the same operating effects as in the present embodiment can be obtained.

What is claimed is:
1. A display panel comprising:
a resin substrate; and
a printed layer formed on at least a part of the resin substrate by inkjet printing, wherein
the printed layer comprises cured products of UV-curable inks containing UV-curable monomers which are polymerized and cured by UV irradiation and the UV-curable ink contains a monofunctional monomer and a polyfunctional monomer as the UV-curable monomers, and
the printed layer has at least the two cured products having different pencil hardness values which are formed by a low concentration polyfunctional monomer ink containing the polyfunctional monomer having an amount of 5 parts by weight or less relative to 100 parts by weight of the UV-curable monomers,
a high concentration polyfunctional monomer ink containing the polyfunctional monomer in an amount of 10 parts by weight or more in 100 parts by weight of the UV-curable monomers,
the display panel has a pressed part where at least a part of the display panel is pressed by another member and the display panel is used in an automotive instrument panel,
the printed layer has the cured product formed from the high concentration polyfunctional monomer ink, at least at the pressed part,
the surface of the display panel has a graphical design part formed to comprise scales and characters and formed on the surface of the display panel, the graphical design part being composed of the printed layer,
the display panel is held inside the casing and has a pressed part being pressed by the casing when the display panel is held inside the casing, the pressed part being at least part of the display panel, and
the printed layer comprising the cured products has a pencil hardness value, and the pencil hardness value at the pressed part being set to be relatively higher than the pencil hardness value at a part of the display panel, the part of the display panel being except for the pressed part.

2. The display panel according to claim 1, wherein the printed layer has one cured product at the pressed part and another cured product at a part except for the pressed part, and the one cured product and the other cured product having same color.

3. The display panel according to claim 1, wherein the UV-curable ink contains at least phenoxyethyl acrylate as the monofunctional monomer, and has the phenoxyethyl acrylate as a main component.

4. The display panel according to claim 1, wherein the at least two cured products having different pencil hardness values are formed in a laminated state or in parallel on approximately the same plane, on the resin substrate.

5. A method for producing a display panel according to claim 1, the method comprising:
   jetting, by means of inkjet printing, at least two such UV-curable inks which obtain different pencil hardness values after curing, on at least a part of the resin substrate, and irradiating the UV-curable inks with UV to cure the UV-curable inks, and to thereby form the cured products.

6. The method for producing a display panel according to claim 5, wherein inks of the same color are used for the inkjet printing, as the at least two such UV-curable inks which obtain different pencil hardness values after curing.

7. The method for producing a display panel according to claim 5, wherein the UV-curable ink contain a monofunctional monomer and a polyfunctional monomer as the UV-curable monomers, and as the at least two such UV-curable inks which obtain different pencil hardness values after curing, at least two inks are having different contents of the polyfunctional monomer.

8. The method for producing a display panel according to claim 7, wherein as the at least two such UV-curable inks which obtain different pencil hardness values after curing, a low concentration polyfunctional monomer ink containing the polyfunctional monomer in an amount of 5 parts by weight or less in 100 parts by weight of the UV-curable monomers, and a high concentration polyfunctional monomer ink containing the polyfunctional monomer in an amount of 10 parts by weight or more in 100 parts by weight of the UV-curable monomers.

9. The method for producing a display panel according to claim 8, wherein the display panel has a pressed part at which at least a part of the display panel is pressed by another member, and in the inkjet printing process, the cured product formed from the high concentration polyfunctional monomer ink is formed at least at the pressed part on the resin substrate.

10. The method for producing a display panel according to claim 8, wherein the display panel has a molded part and/or a processed part at which at least a part of the display panel is subjected to molding and/or processing, and in the inkjet printing process, the cured product formed from the lower concentration polyfunctional monomer ink is formed at least at the molded part and/or the processed part on the resin substrate.

11. The method for producing a display panel according to claim 7, wherein the UV-curable ink contains at least phenoxyethyl acrylate as the monofunctional monomer, and has the phenoxyethyl acrylate as a main component.

12. The method for producing a display panel according to claim 5, wherein in the inkjet printing process, the at least two such cured products having different pencil hardness values are formed in a laminated state or in parallel on approximately the same plane, on the resin substrate.

13. The method for producing a display panel according to claim 5, wherein the inkjet printing is performed using an inkjet printing apparatus equipped with at least two ink tanks respectively containing at least two UV-curable inks which obtain different pencil hardness values after curing.

14. The method for producing a display panel according to claim 5, wherein the display panel is used as an automotive instrument panel.

15. A method for producing a display panel according to claim 1, the method comprising:
   jetting, by means of inkjet printing, a UV-curable ink containing UV-curable monomers which are polymerized and cured by UV irradiation, on at least a part of the resin substrate; and irradiating the UV-curable ink with UV to cure the UV-curable ink, and to thereby form a printed layer;
   wherein the UV-curable ink contains monofunctional monomers and a polyfunctional monomer as the UV-curable monomers, and
   the UV-curable ink contains at least vinylcaprolactam and N-acryloyloxyethyl hexahydrophthalimide as the monofunctional monomers.

16. The method for producing a display panel according to claim 15, wherein the UV-curable ink contains the vinylcaprolactam and the N-acryloyloxyethyl hexahydrophthalimide at a weight ratio of vinylcaprolactam: N-acryloyloxyethyl hexahydrophthalimide=1:0.2 to 2.

17. The method for producing a display panel according to claim 15, wherein the UV-curable ink contains phenoxyethyl acrylate as the monofunctional monomer.

18. The method for producing a display panel according to claim 15, wherein the UV-curable ink contains 55 to 93% by weight of phenoxyethyl acrylate, 5 to 30% by weight of vinylcaprolactam, and 2 to 15% by weight of N-acryloyloxyethyl hexahydrophthalimide.

19. The method for producing a display panel according to claim 15, wherein the UV-curable ink contains oligo(2-hydroxy-2-methyl-1-(4-(methylvinyl)phenyl)propanone as a photopolymerization initiator.

20. A display panel produced according to the method according to claim 15.

21. A display panel comprising:
   a resin substrate; and
   a printed layer formed on at least a part of the resin substrate by inkjet printing; wherein
   the printed layer comprises cured products of UV-curable inks containing UV-curable monomers which are polymerized and cured by UV irradiation and the UV-curable ink contains a monofunctional monomer and a polyfunctional monomer as the UV-curable monomers; and
   the printed layer has at least the two cured products having different pencil hardness values which are formed by a low concentration polyfunctional monomer ink containing the polyfunctional monomer in an amount of 5 parts by weight or less in 100 parts by weight of the UV-curable monomers, a high concentration polyfunctional monomer ink containing the polyfunctional monomer having an amount of 10 parts by weight or more relative to 100 parts by weight of the UV-curable monomers; wherein
   the display panel has a processed part at which at least a part of the display panel is subjected to processing, the display panel is used in an automotive instrument panel;

the printed layer has the cured product formed from the low concentration polyfunctional monomer ink at least at the processed part;

the surface of the display panel has a graphical design part formed to comprise scales and characters and formed on the surface of the display panel, the graphical design part being composed of the printed layer;

the display panel comprises a pointer arranged on the graphical design part, the pointer having a support part disposed in a though-hole formed through the display panel;

the printed layer comprising the cured products has a pencil hardness value; and the pencil hardness value at a processed part in which the through-hole is formed being set to be relatively lower than the pencil hardness value at a part of the display panel, the part of the display panel being except for the processed part.

22. The display panel according to claim 21, wherein the UV-curable ink contains at least phenoxyethyl acrylate as the monofunctional monomer, and has the phenoxyethyl acrylate as a main component.

23. The display panel according to claim 21, wherein the at least two cured products having different pencil hardness values are formed in a laminated state or in parallel on approximately the same plane, on the resin substrate.

24. A display panel comprising:

a resin substrate and a printed layer formed on at least a part of the resin substrate by inkjet printing, wherein the printed layer comprises cured products of UV-curable inks containing UV-curable monomers which are polymerized and cured by UV irradiation and the UV-curable ink contains a monofunctional monomer and a polyfunctional monomer as the UV-curable monomers, the printed layer has at least the two cured products having different pencil hardness values which are formed by a low concentration polyfunctional monomer ink containing the polyfunctional monomer in an amount of 5 parts by weight or less in 100 parts by weight of the UV-curable monomers, a high concentration polyfunctional monomer ink containing the polyfunctional monomer in an amount of 10 parts by weight or more in 100 parts by weight of the UV-curable monomers, the display panel has a molded part at which at least a part of the display panel is subjected to molding, the display panel is used in an automotive instrument panel, and the printed layer has the cured product formed at least at the molded part and formed from the low concentration polyfunctional monomer ink, the surface of the display panel has a graphical design part formed to comprise scales and characters and formed on the surface of the display panel, the graphical design part being composed of the printed layer, the printed layer comprising the cured products has a pencil hardness value, and the pencil hardness value at a molded part in which the graphical design part is partially three-dimensionally molded being set to be relatively lower than the pencil hardness value at a part of the display panel, the part of the display panel being except for the molded part.

25. The display panel according to claim 24, wherein the UV-curable ink contains at least phenoxyethyl acrylate as the monofunctional monomer, and has the phenoxyethyl acrylate as a main component.

26. The display panel according to claim 24, wherein the at least two cured products having different pencil hardness values are formed in a laminated state or in parallel on approximately the same plane, on the resin substrate.

27. A display panel comprising:

a resin substrate and a printed layer formed on at least a part of the resin substrate by inkjet printing, wherein the printed layer comprises cured products of UV-curable inks containing UV-curable monomers which are polymerized and cured by UV irradiation, the UV-curable ink contains at least phenoxyethyl acrylate as the monofunctional monomer, and has the phenoxyethyl acrylate as a main component, and the printed layer has at least the two cured products having different pencil hardness values.

* * * * *

UNITED STATES PATENT AND TRADEMARK OFFICE
CERTIFICATE OF CORRECTION

PATENT NO. : 8,142,866 B2
APPLICATION NO. : 12/231073
DATED : March 27, 2012
INVENTOR(S) : Teruhiko Iwase et al.

It is certified that error appears in the above-identified patent and that said Letters Patent is hereby corrected as shown below:

In the Title Page:

Item (73), Assignee: "Toyo Ink Mfg., Ltd., Tokyo (JP)" should be

-- Toyo Ink Mfg. Co., Ltd., Tokyo --

Signed and Sealed this
Thirteenth Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,142,866 B2  
APPLICATION NO. : 12/231073  
DATED : March 27, 2012  
INVENTOR(S) : Teruhiko Iwase et al.

It is certified that error appears in the above-identified patent and that said Letters Patent is hereby corrected as shown below:

In the Claims:

Col. 47, line 10, Claim 21, delete "though-hole" and replace with --through-hole--

Signed and Sealed this
Thirtieth Day of July, 2013

Teresa Stanek Rea
*Acting Director of the United States Patent and Trademark Office*